(12) United States Patent
Seiberle

(10) Patent No.: US 10,465,116 B2
(45) Date of Patent: Nov. 5, 2019

(54) PHOTOACTIVE POLYMER MATERIALS

(75) Inventor: Hubert Seiberle, Weil am Rhein (DE)

(73) Assignee: ROLIC AG, Zug (CH)

( * ) Notice: Subject to any disclaimer, the term of this patent is extended or adjusted under 35 U.S.C. 154(b) by 996 days.

(21) Appl. No.: 13/996,211

(22) PCT Filed: Dec. 21, 2011

(86) PCT No.: PCT/EP2011/073540
§ 371 (c)(1),
(2), (4) Date: Jun. 20, 2013

(87) PCT Pub. No.: WO2012/085048
PCT Pub. Date: Jun. 28, 2012

(65) Prior Publication Data
US 2013/0281564 A1    Oct. 24, 2013

(30) Foreign Application Priority Data
Dec. 23, 2010 (EP) .................... 10196725

(51) Int. Cl.
*G02F 1/1337* (2006.01)
*C09K 19/38* (2006.01)
*C08F 120/30* (2006.01)
*C08F 220/30* (2006.01)
*B32B 27/36* (2006.01)
*G02F 1/13363* (2006.01)
*G02F 1/1335* (2006.01)

(52) U.S. Cl.
CPC .......... *C09K 19/3838* (2013.01); *B32B 27/36* (2013.01); *C08F 120/30* (2013.01); *C08F 220/30* (2013.01); *B32B 2457/20* (2013.01); *B32B 2457/202* (2013.01); *G02F 1/133788* (2013.01); *G02F 2001/133538* (2013.01); *G02F 2001/133631* (2013.01); *G02F 2413/105* (2013.01)

(58) Field of Classification Search
CPC . B32B 27/36; B32B 2457/20; B32B 457/202; C08F 120/30; C08F 220/30; C09K 19/3838; G02F 1/133788; G02F 2001/133538; G02F 2001/133631; G02F 2413/105
See application file for complete search history.

(56) References Cited

U.S. PATENT DOCUMENTS

| 6,107,427 A | 8/2000 | Herr et al. |
| 6,340,506 B1 | 1/2002 | Buchecker et al. |
| 2003/0232930 A1 | 12/2003 | Gibbons et al. |
| 2007/0179266 A1 | 8/2007 | Studer |
| 2008/0293888 A1 | 11/2008 | Bachels et al. |
| 2012/0008079 A1 | 1/2012 | Mizusaki et al. |
| 2012/0076952 A1 | 3/2012 | Bachels et al. |
| 2014/0138394 A1 | 5/2014 | Heisner et al. |

FOREIGN PATENT DOCUMENTS

| JP | 2-129149 A | 5/1990 |
| JP | 9-118717 A | 5/1997 |
| JP | 2002-37759 A | 2/2002 |
| JP | 2004-530734 A | 10/2004 |
| JP | 2005-528486 A | 9/2005 |
| JP | 2005-326439 A | 11/2005 |
| JP | 2007-304215 A | 11/2007 |
| RU | 2011143816 A | 5/2013 |
| TW | 589329 B | 6/2004 |
| WO | 99/15576 A1 | 4/1999 |
| WO | 2007/071091 A1 | 6/2007 |
| WO | 2008/119449 A1 | 10/2008 |

*Primary Examiner* — Jessica M Roswell
(74) *Attorney, Agent, or Firm* — Sughrue Mion, PLLC

(57) ABSTRACT

The present invention relates to novel photoactive polymer materials their use as orienting layer for liquid crystals, which are used for the production of non-structured and structured optical elements or electro-optical elements and multi-layer systems.

10 Claims, No Drawings

PHOTOACTIVE POLYMER MATERIALS

CROSS REFERENCE TO RELATED APPLICATIONS

This application is a National Stage of International Application No. PCT/EP2011/073540, filed on Dec, 21, 2011, which claims priority from European Patent Application No. 10196725.5, filed on Dec. 23, 2010, the contents of all of which are incorporated herein by reference in their entirety.

The present invention is concerned with novel photoactive polymer materials their use as orienting layer for liquid crystals, which are used for the production of non-structured and structured optical elements or electro-optical elements and multi-layer systems.

Optical elements or electro-optical elements are used for example as security devices, liquid crystal device (LCD), optical films, such as retarders like 3 D retarder. There are photoreactive compounds, described in U.S. Pat. No. 6,107, 427 which can be used as orientation layer for liquid crystals.

However, there is an increasing demand for advanced orienting materials giving access to efficient manufacturing processes, such as roll-to roll-processes, and which materials can be coated on different substrates, and providing good orientation for liquid crystals.

The object of the invention is therefore to provide novel photoreactive polymers which provide good orientation and give access to efficient manufacturing process.

The present invention relates to polymer material which comprises repeating units of formula (I):

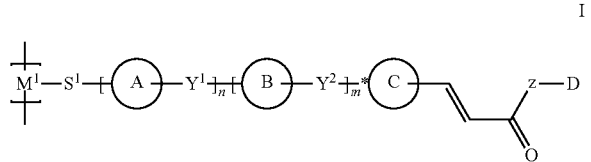

wherein $M^1$ is a monomer unit selected from the group consisting of acrylate, methacrylate, 2-chloroacrylate, 2-phenylacrylate, acrylamide, methacrylamide, 2-chloroacrylamide, 2-phenylacrylamide, N-lower alkyl substituted acrylamide, N-lower alkyl substituted methacrylamide, N-lower alkyl substituted 2-chloroacrylamide, N-lower alkyl substituted 2-phenylacrylamide, vinyl ether, vinyl ester, styrene, diamine, amide, imide, siloxane, amic ester, amic acid; preferred is a monomer unit selected from the group consisting of acrylate, methacrylate, 2-chloroacrylate, 2-phenylacrylate, acrylamide, methacrylamide, 2-chloroacrylamide, 2-phenylacrylamide, N-lower alkyl substituted acrylamide, N-lower alkyl substituted methacrylamide, N-lower alkyl substituted 2-chloroacrylamide, N-lower alkyl substituted 2-phenylacrylamide, vinyl ether, vinyl ester, styrene, siloxane, diamine, amide, amic ester, amic acid; more preferred is a monomer unit selected from the group consisting of acrylate, methacrylate, 2-chloroacrylate, 2-phenylacrylate, vinyl ether, vinyl ester, styrene, siloxane; most preferred is acrylate or methacrylate, ring A is unsubstituted phenylene, phenylene which is substituted with fluorine, chlorine, cyano, alkyl or alkoxy, pyridine-2,5-diyl, pyrimidine-2,5-diyl, 1,3-dioxane-2,5-diyl, cyclohexane-1,4-diyl, piperidine-1,4-diyl, or piperazine-1,4-diyl; preferred is phenylene, ring B is unsubstituted phenylene, phenylene which is substituted with fluorine, chlorine, cyano, alkyl or alkoxy, pyridine-2,5-diyl, pyrimidine-2,5-diyl, 1,4-naphthylene, 2,6-naphthylene, 1,3-dioxane-2,5-diyl, or cyclohexane-1,4-diyl; preferred is phenylene, $Y^1$, $Y^2$ each independently is a single covalent bond, —$(CH_2)_t$—, —O—, —CO—, —CO—O—, —O—OC—, —$NR^4$—, —CO—$NR^4$—, —$R^4N$—CO—, —$(CH_2)_u$—O—, —O—$(CH_2)_u$—, —$CF_2O$—, —$OCF_2$—, —$(CH_2)_u$—$NR^4$—, or —$NR^4$—$(CH_2)_u$—, in which $R^4$ is hydrogen or lower alkyl;
t is a whole number from 1 to 4;
u is a whole number from 1 to 3;
m, n each independently is 0 or 1;

ring C is unsubstituted phenylene, phenylene which is substituted with fluorine, chlorine, cyano, alkyl or alkoxy, pyrimidine-2,5-diyl, pyridine-2,5-diyl, 2,5-thiophenylene, 2,5-furanylene, 1,4-naphthlene, or 2,6-naphthylene;

$S^1$ is a spacer unit, wherein if m and n are 0 then the spacer unit is $S^2$, and if at least one m or n is 1, preferably if m is 1 and n is 0, then the spacer unit is $S^3$; wherein $S^2$ is $C_4$-$C_{24}$alkylene and $S^3$ is $C_9$-$C_{24}$alkylene, preferably $C_{10}$-$C_{24}$alkylene, and wherein alkylene is unsubstituted or substituted, straight-chain or branched alkylene, in which one or more —$CH_2$— groups may be replaced by at least one linking group, alicyclic or/and aromatic group, Z is —O— or —$NR^5$—, in which $R^5$ is hydrogen or lower alkyl, or a second group of formula D, in which D is hydrogen or an unsubstituted $C_1$-$C_{20}$ straight-chain alkylene group, an unsubstituted $C_1$-$C_{20}$ branched-chain alkylene group, a $C_1$-$C_{20}$ straight-chain alkylene group substituted with fluorine or chlorine, a branched-chain $C_1$-$C_{20}$ alkylene group substituted with fluorine or chlorine, an unsubstituted cycloalkyl residue with 3 to 8 ring atoms, or a cycloalkyl residue with 3 to 8 ring atoms substituted with fluorine, chlorine, alkyl or alkoxy.

The term "linking group", as used in the context of the present invention is preferably be selected from —O—, —CO, —CO—O—, —O—CO—,

—$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O—, and —Si$(CH_3)_2$—O—Si$(CH_3)_2$—, and wherein:

$R^1$ represents a hydrogen atom or $C_1$-$C_6$alkyl;
with the proviso that oxygen atoms of linking groups are not directly linked to each other.

Preferably substituent of alkylene in $S^2$ or $S^3$ is $C_1$-$C_{24}$-alkyl, preferably $C_1$-$C_{12}$-alkyl, more preferably $C_1$-$C_8$-alkyl; or hydroxy, fluorine, chlorine, cyano, ether, ester, amino, amido.

In the context of the present invention the term "polymer material" denotes oligomer, polymer, copolymer or homopolymer material.

In the context of the present invention the term "alkyl" is substituted or unsubstituted, straight-chain or branched, saturated hydrocarbon residues with a maximum of 20 carbon atoms, wherein one or more —$CH_2$— or —$CH_3$— groups may be unreplaced or replaced by at least one linking group, or/and alicyclic or/and aromatic group.

The term "lower alkyl" taken alone or in combinations such as "lower alkoxy", "hydroxy-lower alkyl", "phenoxy-lower alkyl", "phenyl-lower alkyl", denotes, hereinbefore and hereinafter, straight-chain or branched saturated hydrocarbon residues with 1 to 6, preferably with 1 to 3, carbon atoms, such as methyl, ethyl, propyl, or i-propyl.

The term "alkyl" taken alone or in combinations such as "alkoxy", denotes, hereinbefore and hereinafter, straight-chain or branched saturated hydrocarbon residues with a maximum of 20 carbon atoms.

The substituents of alkyl are or hydroxy, fluorine, chlorine, cyano, ether, ester, amino, amido, alicyclic or aromatic groups, wherein in each one or more —$CH_2$— group may be replaced by at least one linking group.

In the context of the present invention straight chain alkyl is for example methyl, ethyl, propyl, isopropyl, butyl, sec.-butyl, tert.-butyl, pentyl, hexyl, heptyl, octyl, nonyl, decyl, undecyl, dodecyl, tridecyl, tetradecyl, pentadecyl, hexadecyl, heptadecyl, octadecyl, nondecyl, icosyl, henicosyl, docosyl, tricosyl or quatrocosyl, however not limited to it.

In the context of the present invention alicyclic group denotes preferably a substituted or unsubstituted non-aromatic carbocyclic or heterocyclic group and represents for example ring systems, with 3 to 30 carbon atoms, as for example cyclopropane, cyclobutane, cyclopentane, cyclopentene, cyclohexane, cyclohexene, cyclohexadiene, decaline, adamantane, tetrahydrofuran, dioxane, dioxolane, pyrrolidine, piperidine or a steroidal skeleton such as cholesterol, wherein substituents are preferably methyl, ethyl, propyl, butyl, pentyl, hexyl, heptyl, octyl, more preferably methyl, ethyl, propyl, butyl, pentyl, hexyl, and ost preferred methyl, ethyl, propyl. Preferred alicyclic group is cyclopentane, cyclopentene, cyclohexane, cyclohexene, and more preferred are cyclopentane or cyclohexane.

In the context of the present invention aromatic group denotes preferably five, six, ten or 14 ring atoms, e.g. furan, benzene or phenylene, pyridine, pyrimidine, naphthalenen, which may form ring assemblies, such as biphenylene or triphenylen, which are uninterrupted or interrupted by at least a single heteroatom and/or at least a single linking group; or fused polycyclic systems, such as phenanthrene, tetraline. Preferably aromatic group are benzene, phenylene, biphenylene or triphenylen. More preferred aromatic group are benzene, phenylene and biphenylene. Most preferred is phenylene.

The term "phenylene which is unsubstituted or optionally substituted with fluorine, chlorine, cyano, alkyl or alkoxy" embraces in the scope of the present invention 1,2-, 1,3- or 1,4-phenylene, especially however 1,3- or 1,4-phenylene, which is unsubstituted or mono- or multiply-substituted with fluorine, chlorine, cyano, alkyl or alkoxy, preferably with fluorine, methyl, ethyl, propyl, butyl, methoxy, ethoxy, propoxy, butoxy or cyano.

Especially preferred are 1,4-phenylene residues.

Examples of preferred phenylene residues are 1,3- or, 1,4-phenylene, 4- or 5-methyl-1,3-phenylene, 4- or 5-methoxy-1,3-phenylene, 4- or 5-ethyl-1,3-phenylene, 4- or 5-ethoxy-1,3-phenylene, 2- or 3-methyl-1,4-phenylene, 2- or 3-ethyl-1,4-phenylene, 2- or 3-propyl-1,4-phenylene, 2- or 3-butyl-1,4-phenylene, 2- or 3-methoxy-1,4-phenylene, 2- or 3-ethoxy-1,4-phenylene, 2- or 3-propoxy-1,4-phenylene, 2- or 3-butoxy-1,4-phenylene, 2,3-, 2,6- or 3,5-dimethyl-1,4-phenylene, 2,6- or 3,5-dimethoxy-1,4-phenylene, 2- or 3-fluoro-1,4-phenylene, 2,3-, 2,6- or 3,5-difluoro-1,4-phenylene, 2- or 3-chloro-1,4-phenylene, 2,3-, 2,6- or 3,5-dichloro-1,4-phenylene, 2- or 3-cyano-1,4-phenylene, and the like.

In a more preferred embodiment of the invention $S^2$ or $S^3$ is substituted or unsubstituted, straight-chain or branched, —$(CH_2)_r$—, as well as —$(CH_2)_r$—O—, —$(CH_2)_r$—O—$(CH_2)_s$—, —$(CH_2)_r$—O—$(CH_2)_s$—O—, —$(CH_2)_r$—CO—, —$(CH_2)_r$—CO—O—, —$(CH_2)_r$—O—CO—, —$(CH_2)_r$—$NR^2$—, —$(CH_2)_r$—CO—$NR^2$—, —$(CH_2)_r$—$NR^2$—CO—, —$(CH_2)_r$—$NR^2$—CO—O— or —$(CH_2)_r$—$NR^2$—CO—$NR^3$—; preferably $S^2$ or $S^3$ is optionally mono- or multiply-substituted with $C_1$-$C_{24}$-alkyl, preferably $C_1$-$C_{12}$-alkyl, more preferably $C_1$-$C_8$-alkyl, wherein alkyl has the above given meaning and preferences; or $S^2$ or $S^3$ is optionally mono- or multiply-substituted with hydroxy, fluorine, chlorine, cyano, ether, ester, amino, amido; and wherein one or more —$CH_2$— group may be replaced by a linking group, alicyclic or/and aromatic group;

wherein for $S^2$ the single suffix "r" is a whole number between 4 and 24, preferably between 5 and 12 and more preferably between 5 and 8, especially 6; and for $S^3$ the single suffix "r" is a whole number between 9 and 24, preferably between 9 and 12 and especially 9, 10, 11 or 12; and wherein for $S^2$ the sum of the suffixes "r and s" is a whole number between 1 and 24, preferably between 2 and 12 and more preferably between 5 and 8; and for $S^3$ the sum of the suffixes "r and s" is a whole number between 7 and 24, preferably between 7 and 12 and especially 9, 10, 11 or 12; and $R^2$ and $R^3$ each independently signify hydrogen or lower alkyl.

In a most preferred embodiment of the invention $S^2$ or $S^3$ is unsubstituted or unsubstituted, straight-chain or branched, —$(CH_2)_r$—, as well as —$(CH_2)_r$—O—, —$(CH_2)_r$—O—$(CH_2)_s$—, —$(CH_2)_r$—O—$(CH_2)_s$—O—, —$(CH_2)_r$—CO—, —$(CH_2)_r$—CO—O—, —$(CH_2)_r$—O—CO—, especially —$(CH_2)_r$—O—, —$(CH_2)_r$—O—$(CH_2)_s$—, —$(CH_2)_r$—O—$(CH_2)_s$—O—, —$(CH_2)_r$—CO—, —$(CH_2)_r$—CO—O—, —$(CH_2)_r$—O—CO—, more especially —$(CH_2)_r$—O— which is optionally mono- or multiply-substituted with $C_1$-$C_{24}$-alkyl, preferably $C_1$-$C_{12}$-alkyl, more preferably $C_1$-$C_8$-alkyl; or hydroxy, fluorine, chlorine, cyano, ether, ester, amino, amido; and wherein one or more —$CH_2$— group may be replaced by a linking group, or an alicyclic or aromatic group; and wherein the single suffixes r and s and the sum of the suffixes s and r have the above given meanings and preferences; and $R^2$ and $R^3$ each independently signify hydrogen or lower alkyl.

Examples of preferred "spacer units" $S^2$ are 1,6-hexylene, 1,7-heptylene, 2-methyl-1,2-propylene, 1,3-butylene, ethyleneoxycarbonyl, ethyleneoyloxy, propyleneoxy, propyleneoxycarbonyl, propyleneoyloxy, butyleneoxy, butyleneoxycarbonyl, butyleneoyloxy, propyleneamino, butyleneamino, pentyleneamino, hexyleneamino, heptyleneamino, ethyleneaminocarbonyl, propyleneaminocarbonyl, butyleneaminocarbonyl, ethylenecarbonylamino, propylenecarbonylamino, butylenecarbonylamino, pentylenecarbonylamino, hexylenecarbonylamino, heptylenecarbonylamino, pentyleneaminocarbonyl, hexyleneaminocarbonyl, heptyleneaminocarbonyl, pentyleneoxy, pentyleneoxycarbonyl, pentyleneoyloxy, hexyleneoxy, hexyleneoxycarbonyl, hexyleneoyloxy, heptyleneoxy, heptyleneoxycarbonyl, heptyleneoyloxy, especially preferred is hexyleneoxy. Examples of preferred "spacer units" $S^3$ are 1,9-nonylene, 1,10-decylene, 1,11-undecylene, 1,12-dodecylene, nonylene-oxy, 1,11-undecyleneoxy, 1,12-dodecyleneoxy, 1,11-undecyleneoxycarbonyl, 1,12-dodecyleneoxycarbonyl, nonyleneoxycarbonyl, 1,11-undecyleneoyloxy, 1,12-dodecyleneoyloxy, nonyleneoyloxy, 1,11-undecyleneamino, 1,12-dodecyleneamino, nonyleneamino, 1,11-undecyleneaminocarbonyl, 1,12-dodecyleneaminocarbonyl, nonyleneaminocarbonyl, 1,11-undecylenecarbonylamino, 1,12-dodecylene carbonylamino, nonylenecarbonylamino, and the like.

Especially preferred "spacer units" $S^2$ are a straight-chain alkylene grouping represented by —$(CH_2)_r$—, wherein r is 6, as well as —$(CH_2)_r$—O—, —$(CH_2)_r$—CO—O— and —$(CH_2)_r$—O—CO—.

Further, especially preferred "spacer units" $S^3$ are a straight-chain alkylene grouping represented by —$(CH_2)_r$—, wherein r is 9, 10, 11, 12, as well as —$(CH_2)_r$—O—, —$(CH_2)_r$—CO—O— and —$(CH_2)_r$—O—CO—.

Preferred is a polymer material which comprises repeating units of formula (I):

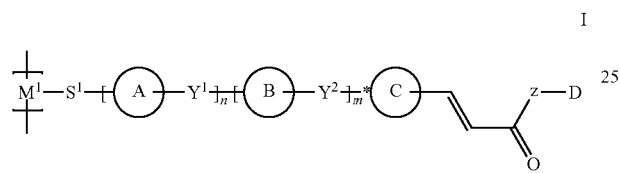

I wherein $M^1$ is a monomer unit selected from the group consisting of acrylate, methacrylate, ring A is unsubstituted phenylene or phenylene which is substituted with alkyl or alkoxy, ring B is unsubstituted phenylene or phenylene which is substituted with fluorine, alkyl or alkoxy, $Y^1$, $Y^2$ each independently is a single covalent bond, —CO—O—, —O—OC—, in which m, n each independently is 0 or 1;

ring C is unsubstituted phenylene or phenylene which is substituted with alkyl or alkoxy;

$S^1$ is a spacer unit, wherein if m and n are 0 then the spacer unit is $S^2$, and if at least one m or n is 1, preferably if m is 1 and n is 0, then the spacer unit is $S^3$; wherein $S^2$ is $C_4$-$C_{24}$alkylene, preferably alkyleneoxy, or alkyleneoxycarbonyl, especially propyleneoxy, butyleneoxy, pentyleneoxy, hexyleneoxy, heptyleneoxy, octyleneoxy, nonyleneoxy, deyleneoxy, or propylenoxycarbonyl, butylenoxycarbonyl, pentylenoxycarbonyl, hexylenoxycarbonyl, heptylenoxycarbonyl, octylenoxycarbonyl, nonylenoxycarbonyl, deylenoxycarbonyl, and $S^3$ is $C_9$-$C_{24}$alkylene, preferably $C_{10}$-$C_{24}$alkylene, and wherein alkylene is unsubstituted or substituted, straight-chain or branched alkylene, in which one or more —$CH_2$— groups may be replaced by at least one linking group, alicyclic or/and aromatic group, Z is —O—, D is hydrogen or an unsubstituted $C_1$-$C_{20}$ straight-chain alkyl group, an unsubstituted $C_1$-$C_{20}$ branched-chain alkyl group, a $C_1$-$C_{20}$ straight-chain alkylene group substituted with fluorine or chlorine, a branched-chain $C_1$-$C_{20}$ alkyl group substituted with fluorine or chlorine, an unsubstituted cycloalkyl residue with 3 to 8 ring atoms, or a cycloalkyl residue with 3 to 8 ring atoms substituted with fluorine, chlorine, alkyl or alkoxy, preferably the $C_1$-$C_{20}$ alkyl group is methyl, ethyl, propyl.

The present invention relates in addition to a monomer compound of formula (I'):

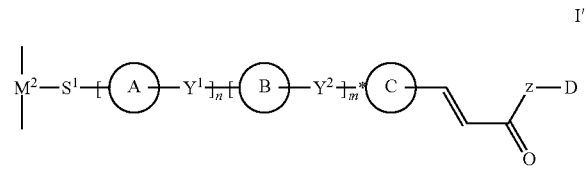

I' wherein $M^2$ is acrylate, methacrylate, 2-chloroacrylate, 2-phenylacrylate, acrylamide, methacrylamide, 2-chloroacrylamide, 2-phenylacrylamide, N-lower alkyl substituted acrylamide, N-lower alkyl substituted methacrylamide, N-lower alkyl substituted 2-chloroacrylamide, N-lower alkyl substituted 2-phenylacrylamide, vinyl ether, vinyl ester, styrene, siloxane, diamine, amide, imide and siloxane, amic ester; preferred is acrylate, methacrylate, 2-chloroacrylate, 2-phenylacrylate, acrylamide, methacrylamide, 2-chloroacrylamide, 2-phenylacrylamide, N-lower alkyl substituted acrylamide, N-lower alkyl substituted methacrylamide, N-lower alkyl substituted 2-chloroacrylamide, N-lower alkyl substituted 2-phenylacrylamide, vinyl ether, vinyl ester, styrene, siloxane; most preferred is acrylate or methacrylate, and $S^1$, A, B, C, D, $Y^1$, $Y^2$, n, m and z have the above given meanings and preferences.

Preferred is a monomer compound of formula (I'): I wherein $M^2$ is a monomer unit selected from the group consisting of acrylate, methacrylate, ring A is unsubstituted phenylene or phenylene which is substituted with alkyl or alkoxy, ring B is unsubstituted phenylene or phenylene which is substituted with fluorine, alkyl or alkoxy, $Y^1$, $Y^2$ each independently is a single covalent bond, —CO—O—, —O—OC—, in which m, n each independently is 0 or 1;

ring C is unsubstituted phenylene or phenylene which is substituted with alkyl or alkoxy;

$S^1$ is a spacer unit, wherein if m and n are 0 then the spacer unit is $S^2$, and if at least one m or n is 1, preferably if m is 1 and n is 0, then the spacer unit is $S^3$; wherein $S^2$ is $C_4$-$C_{24}$alkylene, preferably alkyleneoxy, or alkyleneoxycarbonyl, especially propyleneoxy, butyleneoxy, pentyleneoxy, hexyleneoxy, heptyleneoxy, octyleneoxy, nonyleneoxy, deyleneoxy, or propylenoxycarbonyl, butylenoxycarbonyl, pentylenoxycarbonyl, hexylenoxycarbonyl, heptylenoxycarbonyl, octylenoxycarbonyl, nonylenoxycarbonyl, deylenoxycarbonyl, and $S^3$ is $C_9$-$C_{24}$alkylene, preferably $C_{10}$-$C_{24}$alkylene, and wherein alkylene is unsubstituted or substituted, straight-chain or branched alkylene, in which one or more —$CH_2$— groups may be replaced by at least one linking group, alicyclic or/and aromatic group, Z is —O—, D is hydrogen or an unsubstituted $C_1$-$C_{20}$ straight-chain alkyl group, an unsubstituted $C_1$-$C_{20}$ branched-chain alkyl group, a $C_1$-$C_{20}$ straight-chain alkylene group substituted with fluorine or chlorine, a branched-chain $C_1$-$C_{20}$ alkyl group substituted with fluorine or chlorine, an unsubstituted cycloalkyl residue with 3 to 8 ring atoms, or a cycloalkyl residue with 3 to 8 ring atoms substituted with fluorine, chlorine, alkyl or alkoxy, preferably the $C_1$-$C_{20}$ alkyl group is methyl, ethyl, propyl.

The present invention also relates to a process for the preparation of polymer material which comprises repeating units of formula (I) comprising polymerising a monomer compound of formula (I').

The monomers are accessible by method known in the art, the acrylate or methacrylate monomers are for example accessible by reaction of the hydroxy cinnamate derivative with methacrylic acid, preferably in the presence of DCC or by reaction with methacrylic anhydride in preferably the presence of DMAP.

The present invention also relates to compositions (Ia), especially a formulation or/and a blend comprising a monomer of formula (I'), and optionally a solvent, and optionally a further comonomer unit, preferably a comonomer unit of formula (I'), wherein at least one $M^1$, $S^1$ A, $Y^1$, $Y^2$, n, B, m, C, z or D is different, and/or another comonomer which are usual in polymer chemistry.

Preferably, the composition comprises further solvents, such as especially aprotic or protic polar solvents γ-butyrolactone, N,N-dimethylacetamide, N-methylpyrrolidone or N,N-dimethylformamide, methylethylketon (MEK), 1-methoxypropylacetat (MPA), alcohols, especially 1-methoxypropanol (MP). Preferred are aprotic polar solvents, especially γ-butyrolactone, N,N-dimethylacetamide, N-methylpyrrolidone or N,N-dimethylformamide, methylethylketon (MEK), 1-methoxypropylacetat (MPA).

The polymer material in accordance with the invention can be synthesized only from repeating units of general formula I (homopolymers) or it can contain further repeating units in addition to the repeating units of general formula I (copolymers). Preferred are copolymers with different repeating units. Homopolymers which contain structural units of formula I are especially preferred. The polymers in accordance with the invention have a molecular weight $M_W$ between 1,000 and 5,000,000, preferably however between 5,000 and 2,000,000, especially advantageously however between 10,000 and 1,000,000.

Comonomer units for the polymer materials in accordance with the invention with C—C linkages in the main chain can be further structures of formula (I) and/or however also other structures which are usual in polymer chemistry, such as, for example, straight-chain or branched alkyl esters of acrylic or methacrylic acid, allyl esters of acrylic or methacrylic acid, alkyl vinyl ethers or esters, phenoxyalkyl acrylates or phenoxyalkyl methacrylates, phenylalkyl acrylates or phenylalkyl methacrylates, hydroxyalkyl acrylates or hydroxyalkyl methacrylates with alkyl residues of 1 to 20, preferably 1 to 10, especially however with 1 to 6, carbon atoms, acrylonitrile, methacrylonitrile, styrene, 4-methylstyrene, and the like. Preferred comonomer units are structures of formula I, alkyl esters of acrylic or methacrylic acid, hydroxyalkyl acrylate, hydroxyalkyl methacrylate, acrylonitrile, methacrylonitrile or styrene, but especially structures of formula I, alkyl esters of acrylic or methacrylic acid, hydroxyalkyl acrylate or hydroxyalkyl methacrylate.

Comonomer units for siloxanes are preferably further siloxane structures of formula (I) and/or dimethyl siloxane groups.

The content of comonomer units in the polymers in accordance with the invention, which do not correspond to a structure of formula (I), is smaller than or equal to 50%, preferably smaller than or equal to 30%, but especially smaller than or equal to 15%.

Under the term "copolymers" there are to be understood preferably statistical copolymers such as, for example, copolymers from different derivatives of formula (I) or from structures of formula I with acrylic acid, methacrylic acid or styrene derivatives. Homopolymers embrace linear and cyclic polymers such as, for example, cyclic polysiloxanes, but preferably linear polymers.

Repeating monomer units ($M^1$) are acrylates such as

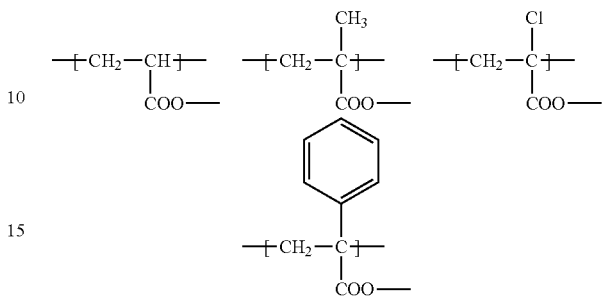

acrylamides such as

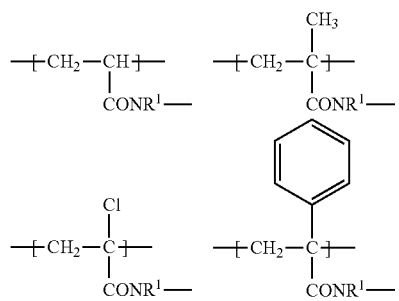

vinyl ether and vinyl ester such as

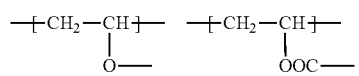

styrene derivatives such as

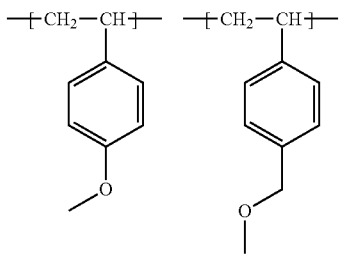

siloxanes such as

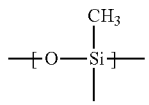

wherein $R^1$ signifies hydrogen or lower alkyl;
amide, imide, amic ester, amic acid or a mixture of imide and amic ester or/and acid such as the condensation product of a diamino comprising alicyclic or aromatic (such as a diamino phenyl group) group with a dianhydride (such as a tetracarboxylic dianhydride).

These condensation products lead to polyamic acid, polyimide, polyamic acid ester and mixtures thereof, which may be prepared in line with known methods, such as those described in Plast. Eng. 36 (1996), (Polyimides, fundamentals and applications), Marcel Dekker, Inc. and in WO WO2007/071091, on page 64 second paragraph to page 68, line 29.

In a preferred embodiment, the present invention relates to a method, wherein a polyamic acid is obtained by reaction, preferably polycondensation reaction, of at least one tetracarboxylic dianhydride with at least one aromatic or alicyclic group having two amino groups.

A polyimide is obtained by the dehydration ring-closure of the above polyamic acid.

Preferred "monomer units" $M^1$ are acrylate, methacrylate, 2-chloroacrylate, acrylamide, methacrylamide, 2-chloroacrylamide, styrene derivatives and siloxanes. Acrylate, methacrylate, styrene derivatives and siloxanes are particularly preferred "monomer units" $M^1$. Quite especially preferred "monomer units" $M^1$ are acrylate, methacrylate and styrene derivatives.

Further, preferred polymer materials of the present invention consist of compounds of formula I in which
  ring A signifies phenylene which is unsubstituted or optionally substituted with fluorine, chlorine, cyano, alkyl or alkoxy, pyridine-2,5-diyl, pyrimidine-2,5-diyl, cyclohexane-1,4-diyl;
  ring B signifies phenylene which is unsubstituted or optionally substituted with fluorine, chlorine, cyano, alkyl or alkoxy, pyridine-2,5-diyl, pyrimidine-2,5-diyl, 1,4- or 2,6-naphthylene, cyclohexane-1,4-diyl;
  $Y^1$, $Y^2$ each independently signify a single covalent bond, —CH$_2$CH$_2$—, —O—, —CF$_2$O—, —OCF$_2$—, —CH$_2$—O—, —O—CH$_2$—, —CO—O— or —O—OC—;
  ring C signifies phenylene which is unsubstituted or optionally substituted with fluorine, chlorine, cyano, alkyl or alkoxy, or pyrimidine-2,5-diyl, pyridine-2,5-diyl, 2,5-furanylene, 1,4- or 2,6-naphthylene;
  Z signifies —O— and
  D signifies hydrogen or a straight-chain or branched alkylene group with 1 to 20, especially with 1 to 12, carbon atoms or a cycloalkyl residue with 5 or 6 ring atoms which is optionally substituted with alkyl or alkoxy, especially with methyl or methoxy, and
  $M^1$ and $S^1$ m and n have the significance given above.

Especially preferred polymer materials consist of compounds of formula I in which n=0 and
  ring B signifies phenylene which is unsubstituted or optionally substituted with fluorine, chlorine, cyano, alkyl or alkoxy, pyridine-2,5-diyl, pyrimidine-2,5-diyl, cyclohexane-1,4-diyl;
  $Y^2$ signifies a single covalent bond, —CO—O— or —O—OC—;
  m signifies 0 or 1;
  ring C signifies phenylene which is unsubstituted or optionally substituted with fluorine, chlorine, cyano, alkyl or alkoxy, or 1,4- or 2,6-naphthylene;
  Z signifies —O— and
  D signifies hydrogen or a straight-chain or branched alkylene group with 1 to 12 carbon atoms and $M^1$ and $S^1$ have the significance given above.

The present invention provides polymer material which comprises with repeating units of formula (Ia) are present,

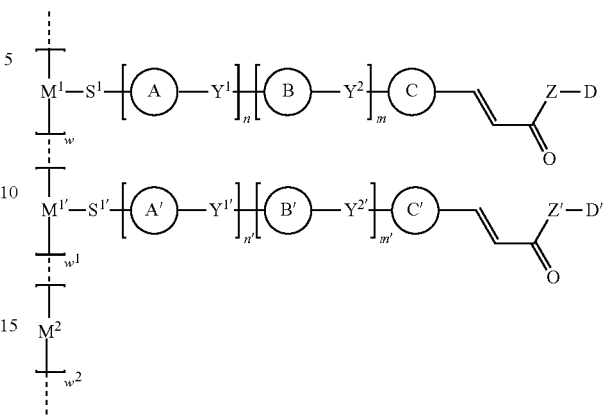

wherein
$M^1$, $M^{1'}$ each independently signify a repeating monomer unit from the group; acrylate, methacrylate, 2-chloroacrylate, 2-phenylacrylate; optionally N-lower alkyl substituted acrylamide, methacrylamide, 2-chloroacrylamide and 2-phenylacrylamide; vinyl ether, vinyl ester, styrene derivative, siloxane, diamine, amide, imide, siloxane, amic ester, amic acid; preferred each independently signify a repeating monomer unit from the group; acrylate, methacrylate, 2-chloroacrylate, 2-phenylacrylate; optionally N-lower alkyl substituted acrylamide, methacrylamide, 2-chloroacrylamide and 2-phenylacrylamide; vinyl ether, vinyl ester, styrene derivative, siloxane, siloxane; more preferred each independently signify a repeating monomer unit from the group; acrylate, methacrylate,
$S^1$ is a spacer unit, wherein, if m and n are 0 then the spacer unit is $S^2$ and if at least one m or n is 1, preferably if m is 1 and n is 0, then the spacer unit is $S^3$;
$S^{1'}$ is a spacer unit, wherein, if m' and n' are 0 then the spacer unit is $S^{2'}$ and if at least one m or n' is 1, preferably if m' is 1 and n' is 0, then the spacer unit is $S^{3'}$; wherein
$S^2$, $S^{2'}$, $S^3$ or $S^{3'}$ are unsubstituted or unsubstituted, straight-chain or branched, —(CH$_2$)$_r$—, as well as —(CH$_2$)$_r$—O—, —(CH$_2$)$_r$—O—(CH$_2$)$_s$—, —(CH$_2$)$_r$—O—(CH$_2$)$_s$—O—, —(CH$_2$)$_r$—O—CO—, —(CH$_2$)$_r$—CO—O—, —(CH$_2$)$_r$—O—CO—, —(CH$_2$)$_r$—NR$^2$—, —(CH$_2$)$_r$—CO—NR$^2$—, —(CH$_2$)$_r$—NR$^2$—CO—, —(CH$_2$)$_r$—NR$^2$—CO—O— or —(CH$_2$)$_r$—NR$^2$—CO—NR$^3$—, which is optionally mono- or multiply-substituted with $C_1$-$C_{24}$-alkyl, preferably $C_1$-$C_{12}$-alkyl, more preferably $C_1$-$C_8$-alkyl; or hydroxy, fluorine, chlorine, cyano, ether, ester, amino, amido; and wherein one or more —CH$_2$— group may be replaced by a linking group, alicyclic or aromatic group; and, in which r and s are each a whole number of 1 to 20,
with the proviso that 3≤r+s≤24, preferably 3≤r+s≤12 and more preferably 3≤r+s≤8 for $S^2$; and that 9≤r+s≤24, preferably 9≤r+s≤12 and more preferably 9≤r+s≤10 for $S^3$; and $R^2$ and $R^3$ each independently signify hydrogen or lower alkyl; preferably $S^1$ and $S^{1'}$ have the above given preferences; and
rings A, A' each independently signify phenylene which is unsubstituted or optionally substituted with fluorine, chlorine, cyano, alkyl or alkoxy, pyridine-2,5-diyl, pyrimidine-2,5-diyl, 1,3-dioxane-2,5-diyl, cyclohexane-1,4-diyl, piperidine-1,4-diyl, piperazine-1,4-diyl;

rings B, B' each independently signify phenylene which is unsubstituted or optionally substituted with fluorine, chlorine, cyano, alkyl or alkoxy, pyridine-2,5-diyl, pyrimidine-2,5-diyl, 1,4- or 2,6-naphthylene, 1,3-dioxane-2,5-diyl, cyclohexane-1,4-diyl;

$Y^1$, $Y^2$, $Y^{1'}$, $Y^{2'}$ each independently signify a single covalent bond, —$(CH_2)_t$—, —O—, —CO—, —CO—O—, —O—OC—, —$CF_2O$—, —$OCF_2$—, —$NR^4$—, —CO—$NR^4$—, —$R^4N$—CO—, —$(CH_2)_u$—O—, —O—$(CH_2)_u$—, —$(CH_2)_u$—$NR^4$— or —$NR^4$—$(CH_2)_u$—, in which $R^4$, $R^{4'}$ each independently signify hydrogen or lower alkyl;

t, t' each independently signify a whole number of 1 to 4;

u, u' each independently signify a whole number of 1 to 3;

rings C, C' each independently signify phenylene which is unsubstituted or optionally substituted with fluorine, chlorine, cyano, alkyl or alkoxy, or pyrimidine-2,5-diyl, pyridine-2,5-diyl, 2,5-thiophenylene, 2,5-furanylene, 1,4- or 2,6-naphthylene;

Z, Z' each independently signify —O— or —$NR^5$—, in which $R^5$ signifies hydrogen or lower alkyl, or a second group of formula D, in which D, D' each independently signify hydrogen or a straight-chain or branched alkylene group with 1 to 20 carbon atoms which is optionally substituted with fluorine or chlorine, a cycloalkyl residue with 3 to 8 ring atoms which is optionally substituted with fluorine, chlorine, alkyl or alkoxy.

$M^2$ signifies a repeating monomer unit from the group; acrylate, methacrylate, 2-chloroacrylate, 2-phenylacrylate; optionally N-lower alkyl substituted acrylamide, methacrylamide, 2-chloroacrylamide and 2-phenylacrylamide; vinyl ether, vinyl ester; straight-chain or branched alkyl esters of acrylic or methacrylic acid, allyl esters of acrylic or methacrylic acid, alkyl vinyl ethers or esters, phenoxyalkyl acrylates or phenoxyalkyl methacrylates, phenylalkyl acrylates or phenylalkyl methacrylates, hydroxyalkyl acrylates or hydroxyalkyl methacrylates with alkyl residues of 1 to 20, preferably 1 to 10, especially however with 1 to 6, carbon atoms; acrylonitrile, methacrylonitrile, styrene, 4-methylstyrene, siloxane; and w, $w^1$ and $w^2$ are molar fractions of the comonomers with $0<w<1$, $0<w^1<1$ and $0<w^2\leq 0.5$.

Preferred are polymer material with repeating units of formula (Ia), wherein $M^1$, $S^1$, $M^{1'}$, $S^{1'}$, $M^2$ and m, n, m', n' are as defined as above; and rings A, A' each independently signify phenylene which is unsubstituted or optionally substituted with fluorine, chlorine, cyano, alkyl or alkoxy, pyridine-2,5-diyl, pyrimidine-2,5-diyl, cyclohexane-1,4-diyl; rings B, B' each independently signify phenylene which is unsubstituted or optionally substituted with fluorine, chlorine, cyano, alkyl or alkoxy, pyridine-2, 5-diyl, pyrimidine-2,5-diyl, 1,4- or 2,6-naphthylene or cyclohexane-1,4-diyl; $Y^1$, $Y^2$, $Y^{1'}$, $Y^{2'}$ each independently signify a single covalent bond, —$CH_2CH_2$—, —O—, —$CH_2$—O—, —O—$CH_2$—, —$CF_2O$—, —$OCF_2$—, —CO—O— or —O—OC—; rings C, C' each independently signify phenylene which is unsubstituted or optionally substituted with fluorine, chlorine, cyano, alkyl or alkoxy, or pyrimidine-2,5-diyl, pyridine-2,5-diyl, 2,5-furanylene or 1,4- or 2,6-naphthylene; Z, Z' signify —O— and D, D' each independently signify a straight-chain or branched alkylene group with 1 to 20, carbon atoms, preferably 1 to 12 carbon atoms or a cycloalkyl residue with 5 to 6 ring atoms which is optionally substituted with alkyl or alkoxy, especially with methyl or methoxy; and w, $w^1$ and $w^2$ are molar fractions of the comonomers with $0<w<1$, $0<w^1<1$ and $0<w^2\leq 0.5$.

Especially preferred are polymer with repeating units of formula (Ia), wherein $M^1$, $S^1$, $M^{1'}$, $S^{1'}$, $M^2$ and m, n, m', n'; and rings B, B' each independently signify phenylene which is unsubstituted or optionally substituted with fluorine, chlorine, cyano, alkyl or alkoxy, pyridine-2,5-diyl, pyrimidine-2,5-diyl or cyclohexane-1,4-diyl;

$Y^2$, $Y^{2'}$ each independently signify a single covalent bond, —CO—O— or —O—OC—;

m, m' each independently signify 0 or 1;

n, n' signify 0;

rings C, C each independently signify phenylene which is unsubstituted or optionally substituted with fluorine, chlorine, cyano, alkyl or alkoxy or 1,4- or 2,6-naphthylene;

Z, Z' signifiy —O— and

D, D' each independently signify hydrogen or a straight-chain or branched alkylene group with 1 to 12 carbon atoms; and w, $w^1$ and $w^2$ are molar fractions of the comonomers with $0<w<1$, $0<w^1<1$ and $0<w^2\leq 0.5$.

Further preferred polymer material of formula (I) containing structures which are usual in polymer chemistry consist of compounds of the formula (Ib),

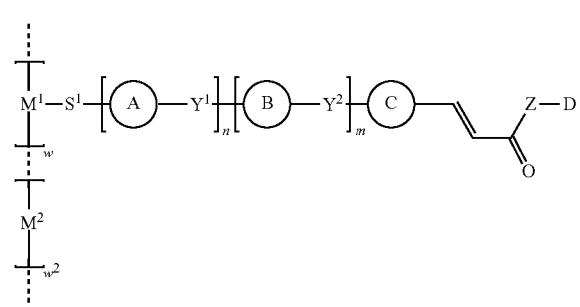

Ib wherein $M^1$, $M^2$, $S^1$, A, B, C, D, Z, $Y^1$, $Y^2$, m and n are as defined above, and w and $w^2$ are molar fractions of the comonomers with $0<w<1$ and $0<w^2\leq 0.5$.

Preferred are copolymer compositions with repeating units of formula (Ib), wherein $M^1$, $M^2$ and $S^1$ are as defined above; and ring A signifies phenylene which is unsubstituted or optionally substituted with fluorine, chlorine, cyano, alkyl or alkoxy, pyridine-2,5-diyl, pyrimidine-2,5-diyl, cyclohexane-1,4-diyl;

ring B signifies phenylene which is unsubstituted or optionally substituted with fluorine, chlorine, cyano, alkyl or alkoxy, pyridine-2,5-diyl, pyrimidine-2,5-diyl, 1,4- or 2,6-naphthylene or cyclohexane-1,4-diyl;

$Y^1$, $Y^2$ each independently signify a single covalent bond, —$CH_2CH_2$—, —O—, —$CH_2$—O—, —O—$CH_2$—, —CO—O— or —O—OC—;

m, n each independently signify 0 or 1;

ring C signifies phenylene which is unsubstituted or optionally substituted with fluorine, chlorine, cyano, alkyl or alkoxy, or pyrimidine-2,5-diyl, pyridine-2,5-diyl, 2,5-furanylene or 1,4- or 2,6-naphthylene;

Z signifies —O—, and

D signifies hydrogen or a straight-chain or branched alkylene group with 1 to 20 carbon atoms, preferably 1 to 12 carbon atoms or a cycloalkyl residue with 5 to 6 ring atoms which is optionally substituted with alkyl or alkoxy, especially with methyl or methoxy; and w and $w^2$ are molar fractions of the comonomers with $0<w<1$ and $0<w^2\leq 0.5$.

Especially preferred are copolymer material comprising repeating units of formula (Ib), wherein n signifies 0 and $M^1$, $M^2$ and $S^1$ are as defined above; and ring B signifies phenylene which is unsubstituted or optionally substituted with fluorine, chlorine, cyano, alkyl or alkoxy, pyridine-2,5-diyl, pyrimidine-2,5-diyl or cyclohexane-1,4-diyl;

$Y^2$ signifies a single covalent bond, —CO—O— or —O—OC—;

m signifies 0 or 1; n signifies 0;

ring C signifies phenylene which is unsubstituted or optionally substituted with fluorine, chlorine, cyano, alkyl or alkoxy or 1,4- or 2,6-naphthylene;

Z signifies —O— and

D signifies hydrogen or a straight-chain or branched alkylene group with 1 to 12 carbon atoms, and w and $w^2$ are molar fractions of the comonomers with $0<w<1$ and $0<w^2\leq 0.5$.

One such preferred copolymer material with structures of formula (Ib) which are usual in polymer chemistry are:

poly[1-[4-[(E)-2-methoxycarbonyl-vinyl]-phenoxycarbonyl]-6-hexyloxycarbonyl]-1-methyl-ethylene-co-1-[1-hydroxy-butoxyoxycarbonyl]-1-methyl-ethylene];

poly[1-[4-[(E)-2-methoxycarbonyl-vinyl]-phenoxycarbonyl]-oxy-6-hexyloxycarbonyl]-1-methyl-ethylene-co-1-[2-ethylhexyloxycarbonyl]-1-methyl-ethylene];

poly[1-[4-[2-methoxy-4-[(E)-2-methoxycarbonyl-vinyl]-phenoxycarbonyl]-phenoxy]-oxy-8-octyloxycarbonyl]-1-methyl-ethylene-co-1-ethoxycarbonyl-1-methyl-ethylene];

poly[1-[4-[2-methoxy-4-[(E)-2-methoxycarbonyl-vinyl]-phenoxycarbonyl]-phenoxy]-oxy-8-octyloxycarbonyl]-1-methyl-ethylene-co-1-[2-ethylhexyloxycarbonyl-1-methyl-ethylene];

poly[1-[4-[(E)-2-methoxycarbonyl-vinyl]-phenoxycarbonyl]-oxy-6-hexyloxycarbonyl]-1-methyl-ethylene-co-1-ethoxycarbonyl-1-methyl-ethylene].

poly[1-[4-[(E)-2-methoxycarbonyl-vinyl]-phenoxycarbonyl]-oxy-6-hexyloxycarbonyl]-1-methyl-ethylene-co-1-[2-hydroxy-ethoxycarbonyl]-1-methyl-ethylene];

Further preferred polymer material of formula I consists of compounds with repeating units of formula (Ic),

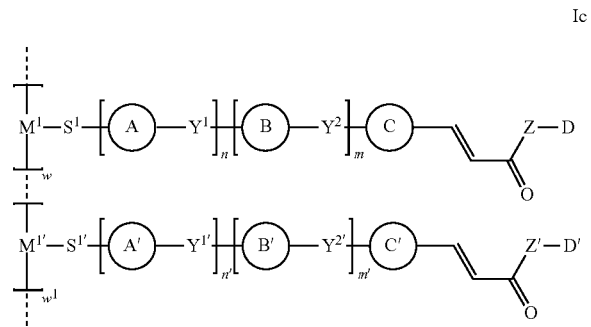

Ic wherein $M^1$, $S^1$, A, B, C, D, Z, $Y^1$, $Y^2$, m and n as well as $M^{1'}$, $S^{1'}$, A', B', C', D', Z', $Y^{1'}$, $Y^{2'}$, m' and n' are as defined above; and w and $w^1$ are molar fractions of the comonomers with $0<w<1$ and $0<w^1<1$.

Preferred are copolymer compositions with repeating units of formula Ic, wherein $M^1$ and $S^1$ as well as $M^{1'}$ and $S^{1'}$ as well as m, n, m', n' are as defined above; and rings A, A' each independently signify phenylene which is unsubstituted or optionally substituted with fluorine, chlorine, cyano, alkyl or alkoxy, pyridine-2,5-diyl, pyrimidine-2,5-diyl, cyclohexane-1,4-diyl;

rings B, B' each independently signify phenylene which is unsubstituted or optionally substituted with fluorine, chlorine, cyano, alkyl or alkoxy, pyridine-2,5-diyl, pyrimidine-2,5-diyl, 1,4- or 2,6-naphthylene or cyclohexane-1,4-diyl; $Y^1$, $Y^2$, $Y^{1'}$, $Y^{2'}$ each independently signify a single covalent bond, —$CH_2CH_2$—, —O—, —$CH_2$—O—, —O—$CH_2$—, —$OCF_2$—, —$CF_2O$—, CO—O— or —O—OC—;

rings C, C' each independently signify phenylene which is unsubstituted or optionally substituted with fluorine, chlorine, cyano, alkyl or alkoxy, or pyrimidine-2,5-diyl, pyridine-2,5-diyl, 2,5-furanylene or 1,4- or 2,6-naphthylene;

Z, Z' signify —O— and

D, D' each independently signify a straight-chain or branched alkylene group with 1 to 20, carbon atoms, preferably 1 to 12 carbon atoms or a cycloalkyl residue with 5 to 6 ring atoms which is optionally substituted with alkyl or alkoxy, especially with methyl or methoxy; and w and $w^1$ are molar fractions of the comonomers with $0<w<1$ and $0<w^1<1$.

Especially preferred are copolymer material comprises with repeating units of formula (Ic), wherein n and n' signify 0 and $M^{1'}$ and $S^1$ as well as $M^{1'}$ and $S^{1'}$ and m, m' are as defined above; and rings B, B' each independently signify phenylene which is unsubstituted or optionally substituted with fluorine, chlorine, cyano, alkyl or alkoxy, pyridine-2,5-diyl, pyrimidine-2,5-diyl or cyclohexane-1,4-diyl;

$Y^2$, $Y^{2'}$ each independently signify a single covalent bond, —CO—O— or —O—OC—;

rings C, C' each independently signify phenylene which is unsubstituted or optionally substituted with fluorine, chlorine, cyano, alkyl or alkoxy or 1,4- or 2,6-naphthylene;

Z, Z' signify —O— and

D, D' each independently signify hydrogen or a straight-chain or branched alkylene group with 1 to 12 carbon atoms; and w and $w^1$ are molar fractions of the comonomers with $0<w<1$ and $0<w^1<1$.

One such preferred copolymer material of formula (I) comprises compounds with repeating units of formula (Ic), namely poly[1-[4-[2-methoxy-4-[(E)-2-methoxycarbonyl-vinyl]-phenoxycarbonyl]]-oxy-6-hexyloxycarbonyl]-1-methyl-ethylene or poly[1-[4-[2-methoxy-4-[(E)-2-methoxycarbonyl-vinyl]-phenoxycarbonyl]-phenoxy]-oxy-6-hexyloxycarbonyl]-1-methyl-ethylene.

Preferred is copolymer material of the formula (Ia).

Especially preferred is copolymer material of the formulae (Ib) and (Ic).

Quite especially preferred is homopolymer material.

Homopolymer material comprising repeating units of formula (I) are preferred,

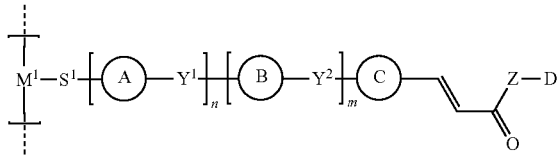

wherein
M¹, S¹, A, B, C, D, Z, Y¹, Y², m and n are as defined above.

Preferred homopolymer is
poly[1-[6-[4-[(E)-2-methoxycarbonyl-vinyl]-phenoxy]]-6-hexyloxy]-1-methyl-ethylene, 2-Propenoic acid, 2-methyl-, 6-[4-[(1E)-3-methoxy-3-oxo-1-propen-1-yl]phenoxy]hexyl ester, homopolymer.

Especially preferred are homopolymer material comprising repeating units of formula (I), wherein
M¹, S¹ and m, n are as defined as above; and
ring A signifies phenylene which is unsubstituted or optionally substituted with fluorine, chlorine, cyano, alkyl or alkoxy, pyridine-2,5-diyl, pyrimidine-2,5-diyl, cyclohexane-1,4-diyl;
ring B signifies phenylene which is unsubstituted or optionally substituted with fluorine, chlorine, cyano, alkyl or alkoxy, pyridine-2,5-diyl, pyrimidine-2,5-diyl, 1,4- or 2,6-naphthylene or cyclohexane-1,4-diyl;
Y¹, Y² each independently signify a single covalent bond, —CH₂CH₂—, —O—, —CH₂—O—, —O—CH₂—, —CO—O—, —O—OC—, —CF₂—O— or —O—F₂C—;
ring C signifies phenylene which is unsubstituted or optionally substituted with fluorine, chlorine, cyano, alkyl or alkoxy, or pyrimidine-2,5-diyl, pyridine-2,5-diyl, 2,5-furanylene or 1,4- or 2,6-naphthylene;
Z signifies —O—, and
D signifies hydrogen or a straight-chain or branched alkylene group with 1 to 20 carbon atoms, preferably 1 to 12 carbon atoms or a cycloalkyl residue with 5 to 6 ring atoms which is optionally substituted with alkyl or alkoxy, especially with methyl or methoxy.

Especially preferred are homopolymer compositions with repeating units of formula I, wherein n signifies 0 and M¹ and S¹ are as defined above; and
ring B signifies phenylene which is unsubstituted or optionally substituted with fluorine, chlorine, cyano, alkyl or alkoxy, pyridine-2,5-diyl, pyrimidine-2,5-diyl or cyclohexane-1,4-diyl;
Y² signifies a single covalent bond, —CO—O— or —O—OC—;
m signifies 0 or 1; n signifies 0;
ring C signifies phenylene which is unsubstituted or optionally substituted with fluorine, chlorine, cyano, alkyl or alkoxy or 1,4- or 2,6-naphthylen;
Z signifies —O—, and
D signifies hydrogen or a straight-chain or branched alkylene group with 1 to 12 carbon atoms.

Especially preferred homopolymer composition include
poly[1-[6-[4-[(E)-2-methoxycarbonyl-vinyl]-phenoxy]-hexoxycarbonyl]-1-methyl-ethylene], 2-Propenoic acid, 2-methyl-, 6-[4-[(1E)-3-methoxy-3-oxo-1-propen-1-yl]phenoxy]hexyl ester, homopolymer.

The polymers of formula I are characterized by being readily accessible. The methods for the production are known to a person skilled in the art.

The present invention relates to a process for the preparation of polymer material of formula (I) comprising reacting the monomer compound of formula (I').

The polymers of formula (I) can be prepared in principal according to two different processes. In addition to the direct polymerization of pre-finished monomers there exists the possibility of polymer-analogous reaction of reactive cinnamic acid derivatives with functional polymers.

For the direct polymerization, the monomers and the comonomers are firstly prepared separately from the individual components. The formation of the polymers is subsequently effected in a manner known per se under the influence of UV radiation or heat or by the action of radical or ionic catalysts. Potassium peroxodisulphate, dibenzoyl peroxide, azobisisobutyronitrile or di-tert.-butylperoxide are examples of radical initiators. Ionic catalysts are alkaliorganic compounds such as phenyllithium or naphthylsodium or Lewis acids such as $BF_3$, $AlCl_3$, $SnCl_3$ or $TiCl_4$. The monomers can be polymerized in solution, suspension, emulsion or substance.

Solvents which are used in the preparation of the polymers according to the invention are as defined above.

In the second process a polymer of formula (I) can also be produced in a polymer-analogous reaction from a pre-finished functional polymer and a suitable functionalized cinnamic acid derivative. Many known processes such as, for example, esterification, trans-esterification, amidation or the etherification are suitable for polymer-analogous reactions.

The etherification of hydroxycinnamic acid derivatives with polyhydroxyalkyl acrylates or polyhydroxyalkyl methacrylates in solution under the conditions of the Mitsunobu reaction has been found to be advantageous here. Thus, the reaction can be carried out, for example, in that all hydroxy groups are reacted (homopolymer) or in that after the reaction hydroxy groups are still free on the polymer, which can then be further functionalized in a further polymer-analogous reaction, by which means copolymers can be synthesized. An alternative possibility for the production of copolymers according to this process comprises using mixtures of different cinnamic acid derivatives.

The cinnamic acids are partially commercially available or can be obtained according to methods known in the literature such as, for example, the Knoevenagel reaction or the Wittig reaction from commercially available aldehydes or from cyano compounds which are obtained by previous reduction to the corresponding aldehydes. The cinnamic esters or amides can then be prepared from the cinnamic acids according to known esterification procedures.

The polymer of formula (I) is in general applied in form of a composition, especially a formulation or blend.

Hence, the present invention further comprises a composition comprising a polymer material of formula (I) and optionally a solvent within the meaning and preferences as given above for solvents,
  in addition optionally further additives, such as
  silane-containing compounds or/and
  epoxy-containing crosslinking agents or/and
  photo-sensitizers, or/and
  photo-radical generators, or/and
  cationic photo-initiators, or/and
  surfactants, or/and
  emulsifiers, or/and
  antioxidant, or/and
  leveling agent.

Suitable silane-containing additives are described in Plast. Eng. 36 (1996), (Polyimides, fundamentals and applications), Marcel Dekker, Inc.

Suitable epoxy-containing cross-linking additives include 4,4'-methylene-bis-(N,N-diglycidylaniline), trimethylolpropane triglycidyl ether, benzene-1,2,4,5-tetracarboxylic acid 1,2,4,5-N,N'-diglycidyldiimide, polyethylene glycol diglycidyl ether, N,N-diglycidylcyclohexylamine and the like.

Suitable photo-active additives include 2,2-dimethoxyphenylethanone, a mixture of diphenylmethanone and N,N-dimethylbenzenamine or ethyl 4-(dimethylamino)benzoate, xanthone, thioxanthone, Irgacure® 184, 369, 500, 651 and 907 (Ciba), Michler's ketone, triaryl sulfonium salt and the like.

The present invention also relates to the use of the polymer materials comprising repeating units of formula (I) as orienting layer for liquid crystals.

Further, the present invention relates to a method for the preparation of an orientation layer for liquid crystals comprising irradiating polymer material which comprises repeating units of formula (I) or the composition comprising polymer material which comprises repeating units of formula (I) with aligning light.

Preferably method comprises
applying a composition comprising a polymer material of formula (I) within the meaning and preferences as described above to a carrier,
and irradiating the polymer material which comprises repeating units of formula (I) or the composition comprising polymer material which comprises repeating units of formula (I) with aligning light.

Especially preferred is the method, wherein two irradiation processes are conducted one with aligning light and the other with or without aligning light, such as isotropic light.

The term "carrier" as used in the context of the present invention is preferably transparent or not-transparent, preferably glass or plastic substrates, polymer films, such as polyethyleneterephthalat (PET), tri-acetyl cellulose (TAC), polypropylen, optionally coated with indium tin oxide (ITO), however not limited to them.

In general the composition is applied by general coating and printing methods known in the art. Coating methods are for example spin coating, air doctor coating, blade coating, knife coating, reverse-roll coating, transfer roll coating, gravure roll coating, kiss roll coating, cast coating, spray coating, slot-orifice coating, calendar coating, electrodepositing coating, dip coating or die coating.

Printing methods are for example relief printing such as flexographic printing, ink jet printing, intaglio printing such as direct gravure printing or offset gravure printing, lithographic printing such as offset printing, or stencil printing such as screen printing.

In the context of the present invention, "aligning light" is light of wavelengths, which can initiate photoreaction, especially which can induce anisotropy in the photoalignment layer of (I). Preferably, the wavelengths are in the UV-A, UVB and/or UV/C-range, or in the visible range. It depends on the photoalignment compound, which wavelengths are appropriate. Preferably, the photo-reactive groups are sensitive to visible and/or UV light. A further embodiment of the invention concerns the generating of aligning light by laser light.

The UV light is preferably selected according to the absorption of the photo-reactive groups, i.e. the absorption of the film should overlap with the emission spectrum of the lamp used for the LP-UV irradiation, more preferably with linearly polarized UV light. The intensity and the energy used are chosen depending on the photosensitivity of the material and on the orientation performances which are targeted. In most of the cases, very low energies (few mJ/cm2) already lead to high orientation quality.

More preferably, "aligning light" is at least partially linearly polarized, elliptically polarized, such as for example circularly polarized, or non-polarized, most preferably circularly polarized, or non-polarized light exposed obliquely, or at least partially linearly polarized light. Especially, most preferred aligning light denotes substantially polarised light, especially linearly polarised light; or aligning light denotes non-polarised light, which is applied by an oblique irradiation.

More preferably, the aligning light is UV light, preferably linearly polarized UV light.

Thus, for the production of orienting layers in regions which are limited selectively by area, a solution of the polymer material obtained can applied. For example, firstly be produced and can be spun in a spin-coating apparatus on to a carrier which is optionally coated with an electrode (for example, a glass plate coated with indium-tin oxide (ITO) such that homogeneous layers of 0.05-50 µm thickness result. Subsequently, the regions to be oriented can be exposed e.g. to a mercury high-pressure lamp, a xenon lamp or a pulsed UV laser using a polarizer and optionally a mask in order to form structures. The duration of the exposure depends on the output of the individual lamps and can vary from a few minutes to several hours. The photoreaction can, however, also be effected by irradiating the homogeneous layer using filters which let through e.g. only the radiation which is suitable for the photo reaction.

A preferred method of the invention relates to processes for the preparation of an orienting layer wherein the time is a critical parameter, especially in which the irradiation time is a critical parameter, such as especially to a roll-to-roll process.

The present invention also relates to orientation layers comprising a polymer material which comprises repeating units of formula (I) or a composition comprising said polymer material.

The use of the polymers in accordance with the invention as orienting layers for liquid crystals as well as their use in of non-structured and structured optical and electro-optical components, especially for the production of hybrid layer elements, is also objects of the present invention.

Further, the present invention relates to optical or electro-optical elements comprising polymer material (I) or/and a composition comprising polymer material (I) or/and an orientation layer prepared by using polymer material (I).

The term "structured" refers to a variation in the azimuthal orientation, which is induced by locally varying the direction of the polarized aligning light.

In addition, the present invention relates to the use of the polymer material according to the present invention as an orienting layer, for aligning organic or inorganic compounds, especially for aligning liquid crystals and liquid crystal polymers.

The present invention also relates to the use of the orienting layer of the invention in the manufacture of optical or electro-optical component and systems, especially multilayer systems, or devices for the preparation of a display waveguide, a security or brand protection element, a bar code, an optical grating, a filter, a retarder, such as 3D-retarder films, a compensation film, a reflectively polarizing film, an absorptive polarizing film, an anisotropically scattering film compensator and retardation film, a twisted retarder film, a cholesteric liquid crystal film, a guest-host liquid crystal film, a monomer corrugated film, a smectic liquid crystal film, a polarizer, a piezoelectric cell, a thin film exhibiting non linear optical properties, a decorative optical element, a brightness enhancement film, a component for wavelength-band-selective compensation, a component for multi-domain compensation, a component of multiview liquid crystal displays, an achromatic retarder, a polarization state correction/adjustment film, a component of optical or electro-optical sensors, a component of brightness enhancement film, a component for light-based telecommunication devices, a G/H-polarizer with an anisotropic absorber, a reflective circular polarizer, a reflective linear polarizer, a MC (monomer corrugated film), liquid crystal displays, especially twisted nematic (TN) liquid crystal displays, hybrid aligned nematic (HAN) liquid crystal displays, electrically controlled birefringence (ECB) liquid crystal displays, supertwisted nematic (STN) liquid crystal displays, optically compensated birefringence (OCB) liquid crystal displays, pi-cell liquid crystal displays, in-plane switching (IPS) liquid crystal displays, fringe field switching (FFS) liquid crystal displays, vertically aligned (VA) liquid crystal displays; all above display types are applied in either transmissive or reflective or transflective mode.

The optical or electro-optical component and systems, especially multilayer systems and devices can be patterned or unpatterned.

The term patterning preferably denotes to birefringence patterning and/or thickness patterning and/or patterning of the optical axis orientation, and/or patterning of the degree of polymerization. Birefringence denotes the difference between the extra-ordinary and the ordinary index of refraction.

Thus the invention further relates to an optical or electro-optical elements, systems and devices device comprising polymer material or composition comprising said polymer material within the above given meaning and preferences.

Preferred are optical or electro-optical elements, systems and devices comprising orienting layers according to the present invention and at least one orientable layer, such as a liquid crystal layer or liquid crystal polymer layer.

An optical component, system or device creates, manipulates, or measures electromagnetic radiation.

An electro-optical component, system or device operates by modification of the optical properties of a material by an electric field. Thus it concerns the interaction between the electromagnetic (optical) and the electrical (electronic) states of materials.

The orienting material has the ability to align compounds, such as for example liquid crystals, such as nematic liquid crystals, with their long axis along a preferred direction.

The present invention also relates to the use of the orienting layer according to the present invention, for aligning organic or inorganic compounds, especially for aligning liquid crystals.

The term "anisotropy" or "anisotropic" refers to the property of being directionally dependent. Something which is anisotropic may appear different or have different characteristics in different directions.

Preferred is the use for the induction of planar alignment, tilted or vertical alignment of adjacent liquid crystalline layers; more preferred is the use for the induction of planar alignment or vertical alignment in adjacent liquid crystalline layers.

It has surprisingly been found in the present invention that side-chain polymers (I) having an elongated spacer unit have fast orientation and are therefore give access to efficient manufacturing processes such as especially roll-to-roll processes. The materials show good orientation properties such as high contrast. They also allow short irradiation times for aligning at almost low energies. Very advantageous it was found that these materials can be coated on several substrates such as glass, or flexible substrates such as PET or TAC and herewith lead to huge palette of applicatory possibilities.

In addition, the polymers in accordance with the invention show a substantially better orientation of the liquid crystals.

The polymers in accordance with the invention are illustrated in more detail by the following Examples. In the Examples hereinafter $T_g$ signifies the glass temperature, $\varepsilon$ signifies the molar decadic absorption coefficient, G signifies a glassy solidification, C signifies the crystalline phase, S signifies the smectic phase, N signifies the nematic phase and I signifies the isotropic phase, p signifies the number of repeating units resulting in polymers having a molecular weight $M_W$ between 1,000 and 5,000,000, preferably however between 5,000 and 2,000,000, especially advantageously however between 10,000 and 1,000,000, w, $w^1$ and $w^2$ are molar fractions of the comonomers with $0<w<1.0<w^1<1$ and $0<w^2\leq 0.5$.

EXAMPLE 1

Poly[1-[6-[4-[(E)-2-methoxycarbonyl-vinyl]-phenoxy]-hexoxycarbonyl]-1-methyl-ethylene], which is 2-Propenoic acid, 2-methyl-,6-[4-[(1E)-3-methoxy-3-oxo-1-propen-1-yl]phenoxy]hexyl ester, homopolymer

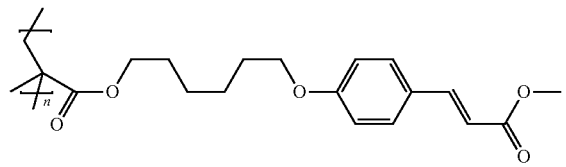

0.73 g (2.03 mmol) of 6-{4-[(1E)-3-methoxy-3-oxoprop-1-enyl]phenoxy}hexyl (2Z)-2-methylbut-2-enoate and 1.67 mg (0.01 mmol) of 2,2'-azo-bis-isobutyronitrile (AIBN) are dissolved in 4.1 ml of tetrahydrofuran (THF). The solution is flushed with a weak stream of argon for 15 minutes. Subsequently, the reaction vessel is sealed air-tight and heated to 60° C. After 24 hours the vessel is opened, the solution is diluted with 4 ml of THF and is added drop wise to 800 ml of diethyl ether at room temperature while stirring vigorously. The separated polymer is filtered off and dried at 60° C. in a water-jet vacuum. For further purification, the polymer is dissolved in 10 ml of dichloromethane and again precipitated in 80 ml of diethyl ether. This procedure is repeated until monomer is no longer detected by thin-layer chromatography. Filtration and drying at 60° C. in a vacuum gives 0.37 g of product poly[1-[6-[4-[(E)-2-methoxycarbonyl-vinyl]-phenoxy]-hexoxycarbonyl]-1-methyl-ethylene]; as a white powder with a glass stage at $T_g$=11° C. and a decadic absorption maximum of $\lambda_{max.}$ (in $CH_2Cl_2$)=309 nm ($\varepsilon$=36000 l/mol cm).

$^1$H-NMR (in $CDCl_3$): 1.730, 1.610, 1.562, 1.4-1 ppm (5×$CH_2$ and $CH_3$), 3.75 ppm ($OOCH_3$), 3.89-3.88 ppm (2×$OCH_2$), 6.27 and 6.23 and 7.60 and 7.56 ppm (CH=CH)

The 6-[4-[(E)-2-Methoxycarbonyl-vinyl]-phenoxy]-hexyl 2-methyl-acrylate used as starting material is prepared according to the following procedure.

Methyl 3-(4-hydroxyphenyl)-acrylate

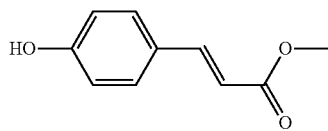

51.2 g (312 mmol) of p-coumaric acid are dissolved in 330 ml of methanol and treated with 10 ml of concentrated sulphuric acid. The solution is heated under reflux for 2 hours. Subsequently the majority of the methanol (about 200 ml) is distilled off and the residue remaining behind was poured into 1.3 l of ice-water. The separated ester is filtered off under suction and washed in succession with cold water, with a small amount of cold NaHCO$_3$ solution and again with cold water. Drying at 50° C. in a water-jet vacuum gives 51.1 g of methyl 3-(4-hydroxyphenyl)-acrylate in the form of a light brownish coloured powder.

Methyl (E)-3-[4-[6-hydroxyhexoxy]-phenyl]-acrylate

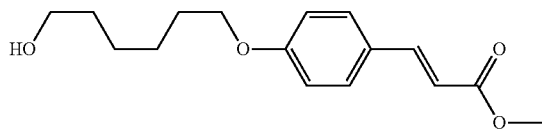 [SMILES: COC(=O)/C=C/c1ccc(OCCCCCCO)cc1]

30 g (168 mmol) of methyl 3-(4-hydroxyphenyl)-acrylate, 29 g (210 mmol) of anhydrous K$_2$CO$_3$ and a spatula tip of KI are placed in 200 ml of dimethylformamide. 17.95 g (185 mmol) of 6-chlorohexanol are added drop wise at 85° C. within 5 minutes while stirring. The batch is stirred at 85° C. for a further 3 days. Subsequently, the salts are filtered off and the filtrate is concentrated to dryness in a water-jet vacuum. 17.2 g of methyl (E)-3-[4-[6-hydroxyhexoxy]-phenyl]-acrylate are obtained in the form of white crystals after recrystallization from i-propanol.

6-[4-[(E)-2-Methoxycarbonyl-vinyl]-phenoxy]-hexyl 2-methyl-acrylate

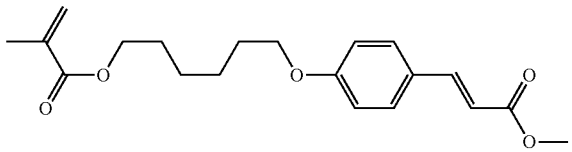 [SMILES: C=C(C)C(=O)OCCCCCCOc1ccc(/C=C/C(=O)OC)cc1]

2.56 g (30 mmol) of methacrylic acid in 10 ml of THF are slowly added drop wise to a solution of 6.1 g (27 mmol) of methyl (E)-3-[4-[6-hydroxyhexoxy]-phenyl]-acrylate, 5.85 g (28.3 mmol) of N,N'-dicyclohexylcarbodiimide (DCC) and 0.37 g (3 mmol) of 4-dimethylaminopyridine in 80 ml of tetrahydrofuran (THF). The batch is stirred at room temperature overnight. In order to complete the reaction there are added firstly a further 1.46 g (7.1 mmol) of DCC and, after stirring for one hour, a further 0.5 g (5.9 mmol) of methacrylic acid. The batch is stirred for a further 24 hours, filtered and the filtrate is extracted 3 times each time with 200 ml of 5% acetic acid and 200 ml of water. The ether phase is dried over Na$_2$SO$_4$, evaporated and the residue is recrystallized from cyclohexane. Subsequently, the still slightly impure product is filtered over a thin silica gel layer (eluent: diethyl ether/hexane=1:1). This gives 8.1 g of 6-[4-[(E)-2-methoxycarbonyl-vinyl]-phenoxy]-hexyl 2-methyl-acrylate as a white powder, having a melting point of 45-50° C. and a decadic absorption maximum of $\lambda_{max.}$ (in CH$_2$Cl$_2$)=310 nm ($\epsilon$=37000 l/mol cm).

The following polymers are synthesized in an analogous manner:

poly[1-[6-[4-[(E)-2-ethoxycarbonyl-vinyl]-phenoxy]-hexoxycarbonyl]-1-methyl-ethylene];

poly[1-[3-[4-[(E)-2-methoxycarbonyl-vinyl]-phenoxy]-propoxycarbonyl]-1-methyl-ethylene]; $\lambda_{max.}$ (in CH$_2$Cl$_2$)=306 nm poly[1-[4-[4-[(E)-2-methoxycarbonyl-vinyl]-phenoxy]-butoxycarbonyl]-1-methyl-ethylene]; $\lambda_{max.}$ (in CH$_2$Cl$_2$)=307 nm poly[1-[5-[4-[(E)-2-methoxycarbonyl-vinyl]-phenoxy]-pentoxycarbonyl]-1-methyl-ethylene]; $\lambda_{max.}$ (in CH$_2$Cl$_2$)=309 nm poly[1-[7-[4-[(E)-2-methoxycarbonyl-vinyl]-phenoxy]-heptoxycarbonyl]-1-methyl-ethylene]; $\lambda_{max.}$ (in CH$_2$Cl$_2$)=309 nm poly[1-[8-[4-[(E)-2-methoxycarbonyl-vinyl]-phenoxy]-octoxycarbonyl]-1-methyl-ethylene]; $T_g$=21.4° C.;

poly[1-[9-[4-[(E)-2-methoxycarbonyl-vinyl]-phenoxy]-undecoxycarbonyl]-1-methyl-ethylene];

poly[1-[4-[4-[(E)-2-methoxycarbonyl-vinyl]-2-methoxyphenoxy]-butoxycarbonyl]-1-methyl-ethylene]; $T_g$=60° C.; $\lambda_{max.}$ (in CH$_2$Cl$_2$)=322.5 and 295.5 nm poly[1-[5-[4-[(E)-2-methoxycarbonyl-vinyl]-2-methoxyphenoxy]-pentoxycarbonyl]-1-methyl-ethylene];

poly[1-[6-[4-[(E)-2-methoxycarbonyl-vinyl]-2-methoxyphenoxy]-hexoxycarbonyl]-1-methyl-ethylene]; $T_g$=64° C.;

poly[1-[8-[4-[(E)-2-methoxycarbonyl-vinyl]-2-methoxyphenoxy]-octoxycarbonyl]-1-methyl-ethylene];

poly[1-[11-[4-[(E)-2-methoxycarbonyl-vinyl]-2-methoxyphenoxy]-undecoxycarbonyl]-1-methyl-ethylene];

poly[1-[8-[4-[(E)-2-methoxycarbonyl-vinyl]-phenoxy]-octoxy]-1-methyl-ethylene]; $\lambda_{max.}$ (in CH$_2$Cl$_2$)=309 nm poly[1-[2-[4-[(E)-2-methoxycarbonyl-vinyl]-phenyl carbonyloxy]-ethoxycarbonyl]-1-methyl-ethylene];

poly[1-[6-[4-[(E)-2-methoxycarbonyl-vinyl]-phenyl carbonyloxy]-hexoxycarbonyl]-1-methyl-ethylene]; $T_g$=29.8° C.;

poly[1-[8-[4-[(E)-2-methoxycarbonyl-vinyl]-phenyl carbonyloxy]-octoxycarbonyl]-1-methyl-ethylene]

poly[1-[6-[4-[(E)-2-methoxycarbonyl-vinyl]-phenoxy]-hexoxycarbonyl]-1-methyl-ethylene-co-[4-hydroxybutoxycarbonyl]-ethylene]

poly[1-[8-[4-[(E)-2-methoxycarbonyl-vinyl]-2-octoxy-phenoxy]-octoxycarbonyl]-1-methyl-ethylene]; $\lambda_{max.}$ (in CH$_2$Cl$_2$)=323 nm ($\epsilon$=17829 l/mol cm), poly[1-[6-[4-[(E)-2-methoxycarbonyl-vinyl]-phenoxy]-hexoxycarbonyl]-1-methyl-ethylene-co-[4-hydroxybutoxycarbonyl]-ethylene], $T_g$=28.5° C.;

poly[1-[8-[4-[(E)-2-methoxycarbonyl-vinyl]-phenoxy]-(4-hexyl)-octoxycarbonyl]-1-methyl-ethylene]; λ$_{max.}$ (in CH$_2$Cl$_2$)=309 nm poly[1-[1-[4-[(E)-2-methoxycarbonyl-vinyl]-2-methoxy-phenoxy]-dec-1-ine-oxycarbonyl]-1-methyl-ethylene]; λ$_{max.}$ (in CH$_2$Cl$_2$)=333 nm poly[1-[3-[4-[(E)-2-methoxycarbonyl-vinyl]-phenoxy]-(2-(4-butyloxyphenyl)-propoxycarbonyl)]-1-methyl-ethylene]; λ$_{max.}$ (in CH$_2$Cl$_2$)=308 nm poly[1-[[3-[(E)-2-methoxycarbonyl-vinyl]-phenoxy]-(2-(4-butyloxyphenyl)-propyl)-1-carbamat-ethoxycarbonyl)]-1-methyl-ethylene]; λ$_{max.}$ (in CH$_2$Cl$_2$)=309 nm poly[1-[[3-[(E)-2-methoxycarbonyl-vinyl]-2-methoxy-phenoxy]-(2-(4-butyloxphenyl)-propyl)-carbamat-ethoxycarbonyl)]-1-methyl-ethylene]; λ$_{max.}$ (in CH$_2$Cl$_2$)=322 nm poly[1-[6-[4-[(E)-2-(adamantylmethoxycarbonyl-vinyl]-2-methoxy-phenoxy]-hexoxycarbonyl]-1-methyl-ethylene]; T$_g$=70° C.;

poly[1-[8-[4-[(E)-2-methoxycarbonyl-vinyl]-phenoxy]-(2-(8-(5,5-dimethyl-1,3-dioxan-2-yl) octyl)-propoxycarbonyl)]-1-methyl-ethylene]; λ$_{max.}$ (in CH$_2$Cl$_2$)=308 nm poly[1-[[3-[(E)-2-methoxycarbonyl-vinyl]-phenoxy]-(3(2-(8-(5,5-dimethyl-1,3-dioxan-2-yl)-propyl)-carbamat-ethoxycarbonyl)]-1-methyl-ethylene]; λ$_{max.}$ (in CH$_2$Cl$_2$)=309 nm poly[1-[8-[4-[(E)-2-methoxycarbonyl-vinyl]-phenoxy]-2-(1-butyl-4-hexyl)-octoxycarbonyl]-1-methyl-ethylene]; λ$_{max.}$ (in CH$_2$Cl$_2$)=309 nm poly[1-[8-[4-[(E)-2-methoxycarbonyl-vinyl]-2-methoxy-phenoxy]-hex-1-ine-oxycarbonyl]-1-methyl-ethylene]; λ$_{max.}$ (in CH$_2$Cl$_2$)=330 nm poly[1-[[1-[(E)-2-methoxycarbonyl-vinyl]-phenoxy]-(propyl-3-((cyclopentyl-2-pentyl)-3-propxycarbonyl)]-1-methyl-ethylene];

poly[1-[8-[4-[(E)-2-methoxycarbonyl-vinyl]-phenoxy]-2-(1-hexyl-6-oxymethyl)-octoxycarbonyl]-1-methyl-ethylene]; λ$_{max.}$ (in CH$_2$Cl$_2$)=310 nm poly[1-[8-[4-[(E)-2-methoxycarbonyl-vinyl]-phenoxy]-2-(1-ethyl)-octoxycarbonyl]-1-methyl-ethylene]; λ$_{max.}$ (in CH$_2$Cl$_2$)=310 nm poly[1-[8-[4-[(E)-2-methoxycarbonyl-vinyl]-2-methoxy-phenoxy]-dec-2-ene-oxycarbonyl]-1-methyl-ethylene];

poly[1-[8-[4-[(E)-2-methoxycarbonyl-vinyl]-2-methoxy-phenoxy]-2-(1-octyl)-octoxycarbonyl]-1-methyl-ethylene]; λ$_{max.}$ (in CH$_2$Cl$_2$)=324 nm poly[1-[8-[4-[(E)-2-methoxycarbonyl-vinyl]-phenoxy]-2-(1-octyl)-octoxycarbonyl]-1-methyl-ethylene]; λ$_{max.}$ (in CH$_2$Cl$_2$)=310 nm poly[1-[8-[4-[(E)-2-methoxycarbonyl-vinyl]-phenoxy]-2-(1-hexyl)-octoxycarbonyl]-1-methyl-ethylene];

poly[1-[8-[4-[(E)-2-methoxycarbonyl-vinyl]-phenoxy]-3-(1-octyl)-octoxycarbonyl]-1-methyl-ethylene]; λ$_{max.}$ (in CH$_2$Cl$_2$)=309 nm poly[1-[8-[4-[(E)-2-methoxycarbonyl-vinyl]-phenoxy]-2-(1-butyl)-octoxycarbonyl]-1-methyl-ethylene]; λ$_{max.}$ (in CH$_2$Cl$_2$)=299 nm poly[1-[6-[4-[(E)-2-methoxycarbonyl-vinyl]-2-methoxy-phenoxy]-2-(1-hexyl)hexoxycarbonyl]-1-methyl-ethylene]

poly[1-[8-[4-[(E)-2-methoxycarbonyl-vinyl]-2-methoxy-phenoxy]-2-(1-butyl)-octoxycarbonyl]-1-methyl-ethylene]; T$_g$=28.5° C.;

EXAMPLE 2

Poly[1-[9-[4-[2-methoxy-4-[(E)-2-methoxycarbonyl-vinyl]-phenoxycarbonyl]-phenoxy]-nonyloxycarbonyl]-1-methyl-ethylene]

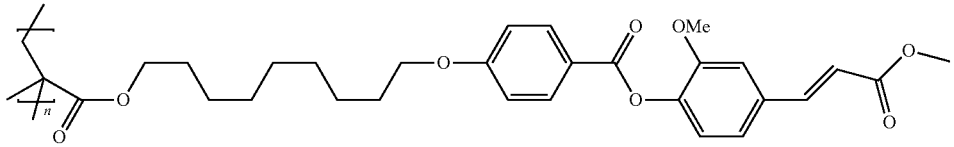

2.5 g (5 mmol) of 2-methoxy-4-[(E)-2-methoxycarbonyl-vinyl]-phenyl 4-[9-(2-methyl-acryloyloxy)-nonyloxy]-benzoate and 8.2 mg (0.05 mmol) of 2,2'-azo-bis-isobutyronitrile are dissolved in 10 ml of tetrahydrofuran (THF). The solution is flushed with a weak stream of argon for 30 minutes. Subsequently, the reaction vessel is sealed air-tight and heated to 55° C. After 24 hours the vessel is opened, the solution is diluted with 8 ml of THF and is added drop wise to 1.6 of ethanol at room temperature while stirring vigorously. The separated polymer is filtered off and dried at 50° C. in a water-jet vacuum. For further purification, the polymer is dissolved in about 25 ml of dichloromethane and again precipitated in 1.75 of methanol. This procedure is repeated until monomer is no longer detectable by thin-layer chromatography. Filtration and drying at 50° C. in a water-jet vacuum gave 2.1 g of poly[1-[9-[4-[2-methoxy-4-[(E)-2-methoxycarbonyl-vinyl]-phenoxycarbonyl]-phenoxy]-nonyloxycarbonyl]-1-methyl-ethylene]

The 2-methoxy-4-[(E)-2-methoxycarbonyl-vinyl]-phenyl 4-[9-(2-methyl-acryloyloxy)-nonyloxy]-benzoate used as the starting material was prepared according to the following procedure:

4-(9-Hydroxy-nonyloxy)-benzoic acid 229.2 g (1.66 mol) of p-hydroxy-benzoic acid are dissolved in 600 ml of methanol and treated at 0° C. within 10 minutes with a solution of 151 g (3.77 mol) of NaOH in 480 ml of H$_2$O. 271.2 g (1.99 mol) of 9-chloro-nonanol are slowly added dropwise to this solution. Finally, 0.75 g of potassium iodide is added and the batch is boiled under reflux for 60 hours. For the working up, the yellow solution is poured into 3 of H$_2$O and treated with 10% HCl (about 600 ml) until a pH value of 1 has been achieved. The milky suspension is filtered over a large suction filter. The residue is sucked dry and recrystallized twice from about 1.5 of ethanol. This gives 230.6 g of 4-(9-hydroxy-nonyloxy)-benzoic acid as a fine white powder.

4-[9-(2-Methyl-acryloyloxy)-nonyloxy]-benzoic acid 88 g (0.3 mol) of 4-(9-hydroxy-nonyloxy)-benzoic acid and 101.5 g (1.18 mol) of methacrylic acid are dissolved in 950 ml of chloroform. After the addition of 7.2 g (0.07 mol) of hydroquinone and 7.2 g (0.04 mol) of p-toluenesulphonic acid the batch is boiled under reflux on a water separator for 48 hours. The clear brown solution is subsequently evaporated, the residue is taken up in 1.5 of diethyl ether, filtered and shaken five time with 300 ml of H₂O each time. The organic phase is dried over Na₂SO₄, evaporated and the residue is recrystallized twice from methanol. After drying at 40° C. in a water-jet vacuum 48.2 g of 4-[9-(2-methyl-acryloyloxy)-nonyloxy]-benzoic acid remained behind as a white powder.

Methyl 4-hydroxy-3-methoxy-cinnamate

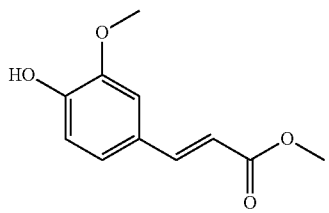

The preparation is effected analogously to Example 1 from 25 g (0.129 mol) of 4-hydroxy-3-methoxy-cinnamic acid and 180 ml of methanol with concentrated sulphuric acid as the catalyst. For purification, it is chromatographed on silica gel with dichloromethane/diethyl ether (19:1). This gives 21.78 g of methyl 4-hydroxy-3-methoxy-cinnamate as a pale yellow oil.

4-[(1E)-3-methoxy-3-oxoprop-1-enyl]-2-methylphenyl 4-{[9-(methacryloyloxy)nonyl]oxy}benzoate

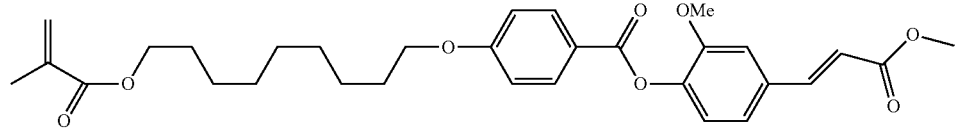 [SMILES: C=C(C)C(=O)OCCCCCCCCCOc1ccc(C(=O)Oc2ccc(/C=C/C(=O)OC)cc2OC)cc1]

8.5 g (0.028 mol) of 4-[9-(2-methyl-acryloyloxy)-nonyloxy]-benzoate are treated with 6 ml of thionyl chloride and 3 drops of DMF and the mixture is heated to 90° C. for 2 hours. The excess thionyl chloride is completely removed firstly in a water-jet vacuum and subsequently in a high vacuum. The residual acid chloride is taken up in 20 ml of dichloromethane and is slowly added dropwise at 0° C. to a solution of 5.25 g (0.025 mol) of methyl 4-hydroxy-3-methoxy-cinnamate and 4.25 ml of triethylamine in 25 ml of THF. The batch is stirred at room temperature overnight, filtered and the filtrate is evaporated to dryness. The residue is purified by column chromatography on silica gel with dichloromethane/diethyl ether (19:1) and subsequently by recrystallization from ethanol/THF. 6.31 g of 2-methoxy-4-[(E)-2-methoxycarbonyl-vinyl]-phenyl 4-[9-(2-methyl-acryloyloxy)-nonyloxy]-benzoate are isolated as a white powder.

The following polymers are synthesized in an analogous manner:

Poly[1-[10-[4-[2-methoxy-4-[(E)-2-methoxycarbonyl-vinyl]-phenoxycarbonyl]-phenoxy]-decyloxycarbonyl]-1-methyl-ethylene];

Poly[1-[11-[4-[2-methoxy-4-[(E)-2-methoxycarbonyl-vinyl]-phenoxycarbonyl]-phenoxy]-undecyloxycarbonyl]-1-methyl-ethylene].

APPLICATION EXAMPLES

In the examples below, solutions of polymer materials according to the invention are prepared and are used for coating thin layers of the polymer material on a substrate.

The polymer-layers are then photo-aligned by exposure to linearly polarized uv-light to generate an orientation layer. On top of each photo-aligned polymer-layer a layer of cross-linkable liquid crystals was prepared, which after having been oriented by the orientation layer are uv cross-linked. The cross-linked liquid crystal (LCP-) layer is analyzed by determination of the contrast ratio, which is a measure of the alignment quality.

The procedure for the preparation of solutions of the polymer material, orientation layers, LCP-layers and the measurement of contrast ratio as well as the characterization of the LCP-layer is described below.

Preparation of a Solution of the Polymer Material (=Composition)

A solution of a polymer material is prepared by dissolving 2% by weight of the polymer material in cyclopentanone. The polymer solution is stirred for 30 minutes at room temperature.

Preparation of an Orientation Layer

A glass substrate is spin coated with the polymer solution at a spinning speed of 3000 rpm for 1 minute. The coated substrate is then dried at 180° C. for 10 minutes. The thickness of the resulting polymer-layer is about 50 nm.

The polymer-layers are exposed to linearly polarized uv-light (LPUV) in the wavelength range of 280 to 340 nm.

The substrate area is segmented into 8 stripes, each of which is irradiated with a different LPUV energy, namely 1, 2, 4, 8, 16, 32 and 64 up to 600 mJ/cm², in order to study the energy dependence of the orientation performance. The polarization direction is the same for all segments.

Preparation of LCP-Solutions

LCP-Solution S1: Mixture M1$_{LCP}$, comprising cross-linkable liquid crystals consisted of:

67.4% LC1
19.2% LC2
9.6% C1
1.9% Irgacure® 369
1.9% BHT, 4-methyl-2, di-tertiary butyl phenol LCP-solution S1 is prepared by dissolving 15% by weight of mixture M1$_{LCP}$ in anisole and then stirring the solution for 30 minutes at 50° C.

LCP-Solution S2: Mixture M2$_{LCP}$, comprising cross-linkable liquid crystals consisted of:

77.0% LC1
14.4% LC3
4.8% LC4
1.9% Irgacure® 369
1.9% BT, 4-methyl-2, di-tertiary butyl phenol LCP-solution S2 is prepared by dissolving 10% by weight of mixture M2$_{LCP}$ in Anisole and then stirring the solution for 30 minutes at 50° C.

Ecr500 is introduced, which is defined as the lowest exposure energy for the polymer, for which the contrast ratio in the LCP layer is 500:1. For the evaluation of Ecr500 the

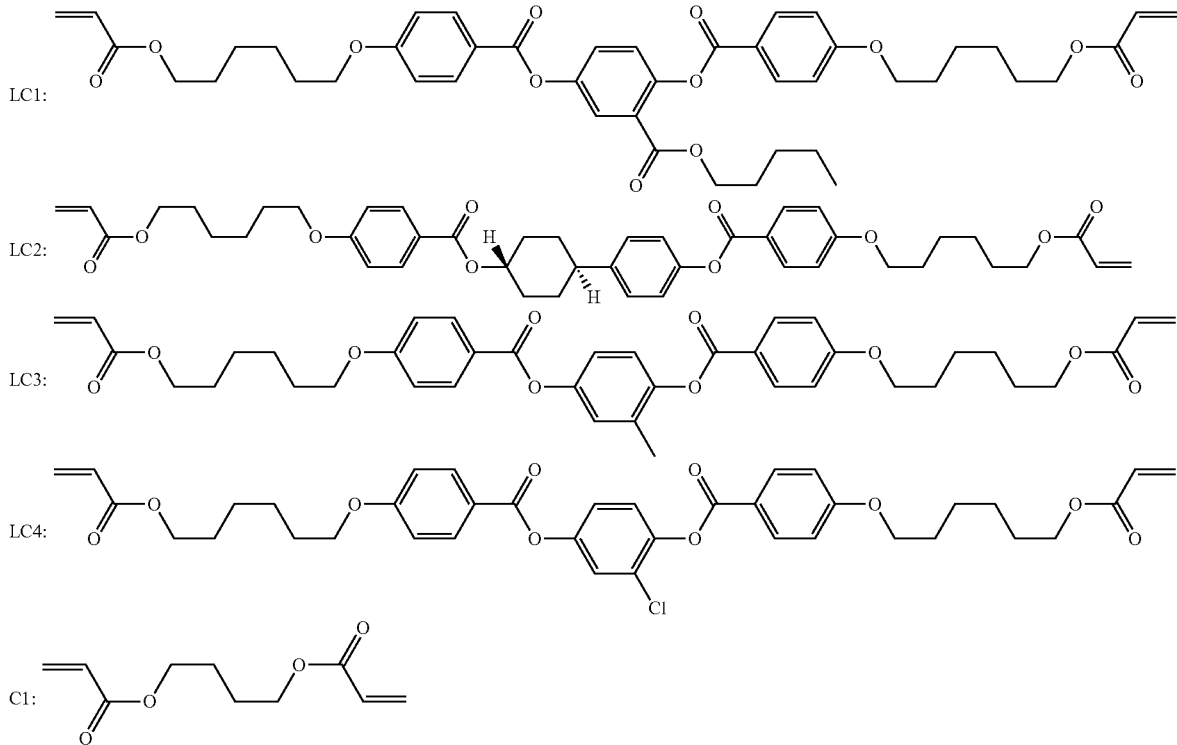

Preparation of a LCP Layer Aligned by the Orientation Layer

An LCP layer is prepared on top of the orientation layer by spin-coating the respective LCP-solution at 1000 rpm for 2 minutes. The liquid crystal layer is then annealed for 10 minutes at 50° C. and subsequently the liquid crystals are cross-linked at room temperature in nitrogen atmosphere by irradiation with UV-A light of 2 mW/cm$^2$ for 5 minutes.

Measurement of Contrast Ratio

Contrast ratio is measured with a polarizing microscope, equipped with a photo-multiplier as a light sensor. Measurements are done with the polarizers in crossed position. The substrate with the birefringent LCP-layer is fixed on a rotatable sample holder. For determination of the contrast ratio two measurements are performed. For the first measurement the sample is rotated to the position with the lowest intensity measured by the photo-multiplier. In this position the optical axis is parallel to one of the polarizers and the measured intensity is defined as the dark state intensity. Then the sample is rotated by 45°, which means that the optical axis is at 45° to both polarizers. The light intensity measured in this position is defined as the bright state intensity. The contrast of the birefringent LCP-layer is then determined by the ratio of intensities of bright state to dark state. The contrast ratio measured in this way is a measure for the alignment quality of the LCP-layer. If the liquid crystal layer is not oriented at all, then dark and bright state intensities are identical and the contrast ratio is 1:1.

Evaluation of Orientation Thresholds

For an efficient manufacturing process it is of interest: a) how much exposure energy does a photo-alignment layer require to achieve a certain contrast ratio in a LCP layer aligned by the orientation layer. Accordingly, a parameter contrast ratio is determined in each of the stripes, which are photo-aligned with different energies, and then Ecr500 is evaluated by interpolation of the contrast ratio data. b) On the other hand, if the tact times and the polarized uv-light intensity in a production line are already fixed, the exposure energy for the polymer is also fixed. In that case the question arises what kind of contrast can be achieved in an LCP layer oriented by an orientation layer exposed to said exposure energy. Therefore, a second parameter CR4 is introduced for the evaluation in the examples, which is defined as the contrast ratio achieved in a LCP-layer, which is aligned by the orientation layer, wherein the orientation layer has been exposed to linearly polarized uv-light of 4 mJ/cm$^2$.

EXAMPLE 1

For each polymer material listed below, solution S1 was used to prepare LCP-layers, which are aligned by the orientation layer, according to the procedure described above, which means: preparation of a solution of the polymer material, preparation of an orientation layer, preparation of LCP solution S1 and finally the preparation of the LCP-layer, which is aligned by the orientation layer.

The evaluation of the orientation performance parameters is then performed as described above.

| | Ecr500 [mJ/cm$^2$] | CR4 |
|---|---|---|
| poly [1-[3-[4-[(E)-2-methoxycarbonyl-vinyl]-phenoxy]-propoxycarbonyl]-1-methyl-ethylene] | 4.5 | 470:1 |

-continued

| | Ecr500 [mJ/cm²] | CR4 |
|---|---|---|
| poly [1-[4-[4-[(E)-2-methoxycarbonyl-vinyl]-phenoxy]-butoxycarbonyl]-1-methyl-ethylene] | 1.8 | 850:1 |
| poly [1-[5-[4-[(E)-2-methoxycarbonyl-vinyl]-phenoxy]-pentoxycarbonyl]-1-methyl-ethylene] | 2.1 | 824:1 |
| poly [1-[6-[4-[(E)-2-methoxycarbonyl-vinyl]-phenoxy]-hexoxycarbonyl]-1-methyl-ethylene] | 1.9 | 1000:1 |
| poly [1-[7-[4-[(E)-2-methoxycarbonyl-vinyl]-phenoxy]-heptoxycarbonyl]-1-methyl-ethylene] | | 465:1 |
| poly [1-[8-[4-[(E)-2-methoxycarbonyl-vinyl]-phenoxy]-octoxycarbonyl]-1-methyl-ethylene] | 1.8 | 400:1 |

| | Ecr500 [mJ/cm²] | CR4 |
|---|---|---|
| poly [1-[6-[4-[(E)-2-methoxycarbonyl-vinyl]-phenyl carbonyloxy]-hexoxycarbonyl]-1-methyl-ethylene] | 3 | 626:1 |
| poly [1-[8-[4-[(E)-2-methoxycarbonyl-vinyl]-phenyl carbonyloxy]-octoxycarbonyl]-1-methyl-ethylene] | 1.8 | 910:1 |

| | Ecr500 [mJ/cm²] | CR4 |
|---|---|---|
| poly [1-[6-[4-[(E)-2-methoxycarbonyl-vinyl]-2-methoxyphenoxy]-hexoxycarbonyl]-1-methyl-ethylene]; | 5.6 | 402:1 |
| poly [1-[8-[4-[(E)-2-methoxycarbonyl-vinyl]-2-methoxyphenoxy]-octoxycarbonyl]-1-methyl-ethylene] | 4.3 | 474:1 |

EXAMPLE 2

For each polymer material listed below, solution S2 was used to prepare aligned LCP-layers, which are aligned by the orientation layer, according to the procedure described above, which means: preparation of solution of polymer material, preparation of a photo-alignment layer, preparation of LCP solution S2 and finally the preparation of the aligned LCP layer, which is aligned by the orientation layer.

The evaluation of the orientation performance parameters was then performed as described above.

| | Ecr500 [mJ/cm²] | CR4 |
|---|---|---|
| poly [1-[10-[4-[2-methoxy-4-[(E)-2-methoxycarbonyl-vinyl]-phenoxycarbonyl]-phenoxy]-decyloxycarbonyl]-1-methyl-ethylene] | 8 | 60:1 |
| poly [1-[11-[4-[2-methoxy-4-[(E)-2-methoxycarbonyl-vinyl]-phenoxycarbonyl]-phenoxy]-undecyloxycarbonyl]-1-methyl-ethylene] | 4 | 500:1 |

What is claimed is:

1. Polymer material which comprises repeating units of formula (I):

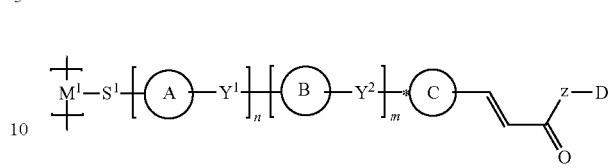

wherein
M¹ is a monomer unit selected from the group consisting of acrylate, methacrylate,
ring A is unsubstituted phenylene or phenylene which is substituted with alkyl or alkoxy,
ring B is phenylene,
$Y^1$, $Y^2$ are —CO—O—;
m, n are both 0;
ring C is unsubstituted phenylene or phenylene which is substituted with methoxy, ethoxy, propoxy or butoxy;
$S^1$ is a spacer unit $S^2$;
wherein $S^2$ is —$(CH_2)_r$—O—, wherein r is 6;
Z is —O—,
D is methyl, ethyl, propyl;
wherein the polymer material is a homopolymer.

2. Process for the preparation of polymer material which comprises repeating units of formula (I) according to claim 1 comprising polymerising a monomer compound of formula (I')

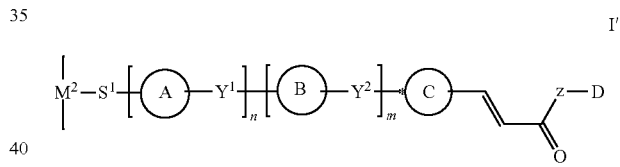

wherein
M² is acrylate, methacrylate;
and $S^1$, A, B, C, D, $Y^1$, $Y^2$, n, m and z have the meanings as described in claim 1.

3. Monomer compound of formula (I'):

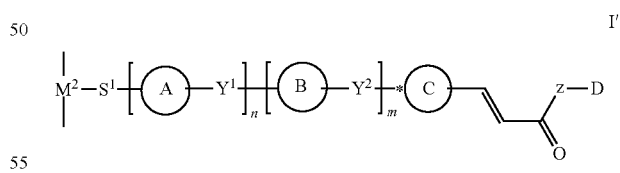

wherein
M² is acrylate, methacrylate;
and $S^1$, A, B, C, D, $Y^1$, $Y^2$, n, m and z have the meanings as described in claim 1.

4. A polymer material according to claim 1 which is poly [1-[6-[4-[(E)-2-methoxycarbonyl-vinyl]-phenoxy]-hexoxycarbonyl]-1-methyl-ethylene].

5. A monomer compound of formula (I') according to claim 3 which is represented by
6-[4-[(E)-2-methoxycarbonyl-vinyl]-phenoxy]-hexyl 2-methyl-acrylate.

6. Composition comprising a polymer material of formula (I) according to claim 1 and optionally a solvent selected from the group consisting of γ-butyrolactone, N,N-dimethylacetamide, N-methylpyrrolidone, N,N-dimethylformamide, methylethylketone (MEK), 1-methoxypropylacetate (MPA), 1-methoxypropanol (MP).

7. Method of using the polymer material comprising repeating units of formula (I) according to claim 1, or a composition thereof, comprising providing the polymer material or the composition as orienting layer for liquid crystals.

8. Method for the preparation of an orientation layer for liquid crystals comprising irradiating polymer material which comprises repeating units of formula (I) according to claim 1.

9. Orientation layers comprising a polymer material which comprises repeating units of formula (I) according to claim 1, comprising said polymer material.

10. Optical or electro-optical elements comprising the polymer material according to claim 1.

* * * * *